US011359829B2

(12) United States Patent
Thomas, Sr.

(10) Patent No.: US 11,359,829 B2
(45) Date of Patent: Jun. 14, 2022

(54) QUASI-EQUILIBRIUM ATMOSPHERIC MODULAR THERMODYNAMIC SYSTEM AND METHOD

(71) Applicant: Rupert R. Thomas, Sr., Edmond, OK (US)

(72) Inventor: Rupert R. Thomas, Sr., Edmond, OK (US)

(*) Notice: Subject to any disclaimer, the term of this patent is extended or adjusted under 35 U.S.C. 154(b) by 280 days.

(21) Appl. No.: 16/460,688

(22) Filed: Jul. 2, 2019

(65) Prior Publication Data

US 2020/0011557 A1 Jan. 9, 2020

Related U.S. Application Data

(60) Provisional application No. 62/693,763, filed on Jul. 3, 2018.

(51) Int. Cl.
*F24F 11/30* (2018.01)
*E04B 1/32* (2006.01)
*F24F 110/10* (2018.01)
*F24F 110/20* (2018.01)

(52) U.S. Cl.
CPC ............ *F24F 11/30* (2018.01); *E04B 1/3211* (2013.01); *F24F 2110/10* (2018.01); *F24F 2110/20* (2018.01)

(58) Field of Classification Search
CPC ........ F24F 11/30; F24F 11/63; F24F 2110/10; F24F 2110/20; F24F 2110/30; F24F 2110/40; F24F 2110/50; F24F 2013/221; E04B 1/3211
USPC .................................................. 454/168, 370
See application file for complete search history.

(56) References Cited

U.S. PATENT DOCUMENTS

| 625,258 A | 5/1899 | Grow |
| 2,822,765 A | 2/1958 | Rudinger |
| 3,092,933 A | 6/1963 | Closner et al. |
| 3,227,061 A | 1/1966 | Swayze |

(Continued)

OTHER PUBLICATIONS

Fine Homebuilding, hobbit house, Sep. 15, 2006, https://www.finehomebuilding.com/forum/hobbit-house-2 (Year: 2006).*

(Continued)

*Primary Examiner* — Avinash A Savani
*Assistant Examiner* — Dana K Tighe
(74) *Attorney, Agent, or Firm* — Dunlap Codding, P.C.

(57) ABSTRACT

Controlled internal atmosphere systems and methods are disclosed, including a system comprising a cell having a top, a bottom, and wall(s) extending between the top and bottom defining an enclosed area inside the cell; the top and wall comprising a first layer having embedded energy-transfer tubing, a sealant layer outside the first layer, an aerated substrate layer outside the sealant layer, and an impermeable layer outside the substrate layer; a heating/cooling unit connectable to the tubing to control the temperature of the first layer and thereby control the temperature of an atmosphere of the enclosed area inside the cell; sensor(s) within the enclosed area; and a computer configured to receive input from the sensor(s) indicative of the condition of the enclosed area atmosphere, to receive input regarding environmental conditions outside of the cell, and to control operation of the heating/cooling unit based on the received input and predicted effects.

25 Claims, 11 Drawing Sheets

(56) References Cited

U.S. PATENT DOCUMENTS

| | | | |
|---|---|---|---|
| 3,701,262 A | 10/1972 | Connell et al. | |
| 3,707,850 A | 1/1973 | Connell et al. | |
| 4,321,775 A | 3/1982 | Emerson | |
| 4,359,845 A | 11/1982 | Harrison | |
| 4,488,392 A | 12/1984 | Pearcey et al. | |
| 4,534,144 A | 8/1985 | Gustafsson et al. | |
| 4,631,872 A | 12/1986 | Daroga | |
| 4,642,952 A | 2/1987 | Prandin | |
| 4,907,739 A * | 3/1990 | Drake | F24D 3/1066 236/12.11 |
| 5,344,362 A | 9/1994 | Bagley | |
| 6,076,313 A | 6/2000 | Pannell et al. | |
| 9,804,607 B1 * | 10/2017 | Coleman | B23P 11/00 |
| 2009/0101305 A1 * | 4/2009 | Clark | F24D 3/08 165/53 |
| 2016/0378127 A1 * | 12/2016 | Scelzi | G05B 11/01 700/295 |
| 2018/0285810 A1 * | 10/2018 | Ramachandran | G06F 16/27 |
| 2019/0338404 A1 * | 11/2019 | Dunn | C22F 1/047 |

OTHER PUBLICATIONS

South and Parker, Monolithic Homes, Jan. 22, 2009, https://www.monolithic.org/homes/home/underground-homes-good-or-bad (Year: 2009).*
Kupferman et al., Tree Fruit Postharvest Journal, vol. 8, No. 3, Cooperative Extension Washington State University, Oct. 1997.
Kaeser Compressors, Brochure, "Screw Compressors M12 Portable Compressor", 1996.
Kaeser Compressors, Inc., Brochure, "Air Compressor Guide Getting the Most for Your Money", 1992.
Formworks Building, Inc., Brochure, Durango, CO, 1998.
Seal Master Corporation, Brochure, "Custom-Built Inflatable Seals" and specifications, Kent, OH, 1997.
Teton West, "U.S. Pat. No. 5,344,362 Potato Patent: Mother Nature, Storage Patent: Teton West", Teton West, Idaho, 1998.
"Modern Storage", Potato Grower of Idaho, Dec. 1994, pp. 14-15, 25.
Rawlings et al., "No Corners Cut at Wada Farms", Potato Grower, Dec. 1997, p. 8.
"More Practical Wind Power", Machine Design, Sep. 11, 1997, p. 35.
Wallguard Corporation, Product Description, Oak Creek, WI, 1997.
Hait et al., "Passive Annual Heat Storage—Improving the Design of Earth Shelters", Rocky Mountain Research Center, 1993.
Becker et al., "Design Essentials for Refrigerated Storage Facilities", American Society of Heating, Refrigerating and Air-Conditioning Engineers, Inc., Atlanta, GA, 2005.
Garrett, Brandon, "Walipini Style Greenhouses", PeakProsperity.com, Mar. 21, 2014.
"The Most Affordable Complete Smart Form Solution Available", GrowLink, http://growlink.com, last visited Apr. 1, 2018.
"Aqua Products Chillers", Aqua Products Company, Inc., http://www.aquaproducts.us/reverse.cycle-chiller, last visited Apr. 1, 2018.
"Reverse Cycle Chiller", Aqua Products Company, Inc., http://www.aquaproducts.us/reverse-cycle-chiller, last visited Apr. 1, 2018.
"6 Tools Our Meterologists Use to Forecast the Weather", National Oceanic and Atmospheric Administration, U.S. Department of Commerce, http://www.noaa.gov/stories/6-tools-our-meteorologists-use-to-forecast-weather, Aug. 14, 2017.
Gupta, Ashutosh, "All About Flexible Concrete or Bendable Concrete—Engineered Cementitious Composite (ECC)", Civil Digital, https://civildigital.com/all-about-flexible-concrete-bendable-concrete-engineered-cementitious-composite-ecc/, Apr. 1, 2017.
NathanF et al., "Pumping it Up With an Air-Source Heat Pump", OffTheGridNews, http://www.offthegridnews.com/grid-threats/pumping-it-up-with-an-air-source-heat-pump/, 2012.
"Air-Source Heat Pumps", Energy Saver, U.S. Department of Energy—Office of Energy Efficiency & Renewable Energy, Washington D.C., https://www.energy.gov/energysaver/heat-pump-systems/air-source-heat-pumps, last visited Apr. 1, 2018.

* cited by examiner

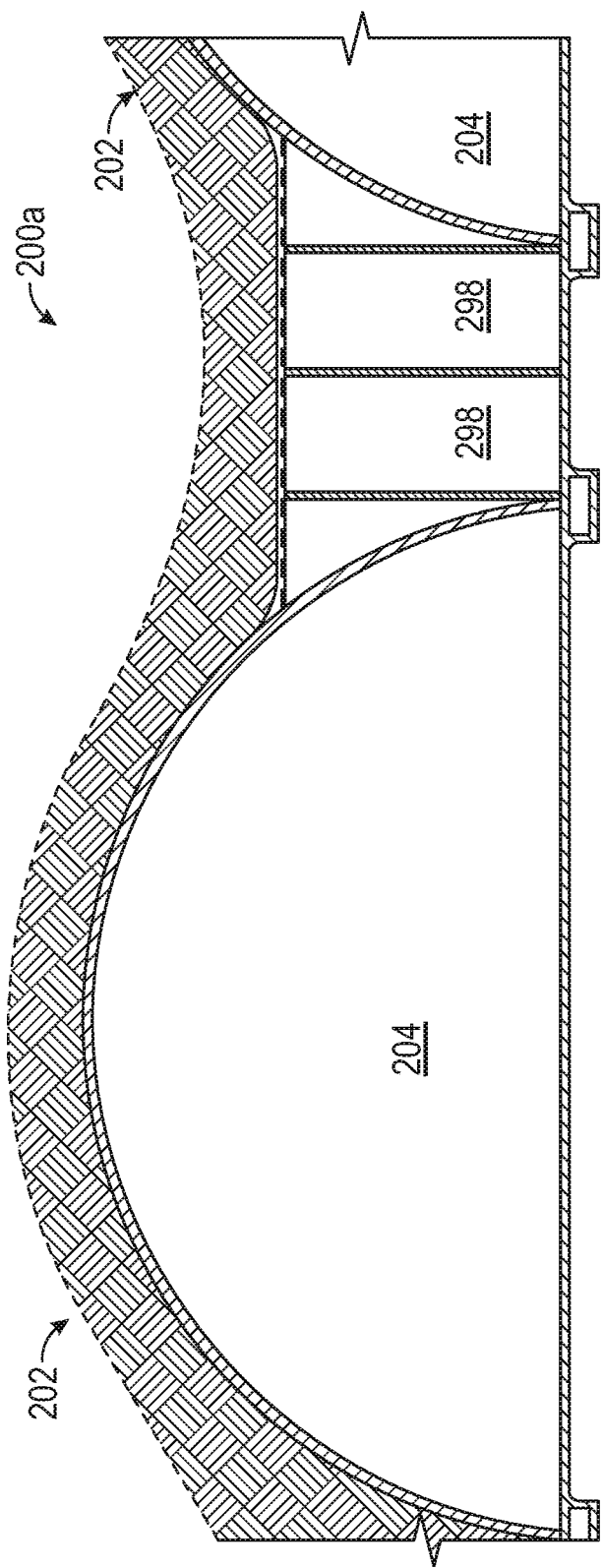
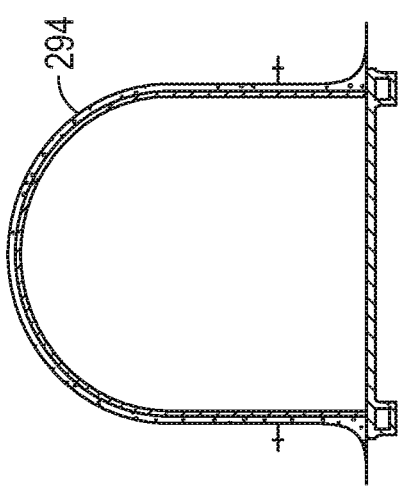
FIG. 7A
FIG. 7B

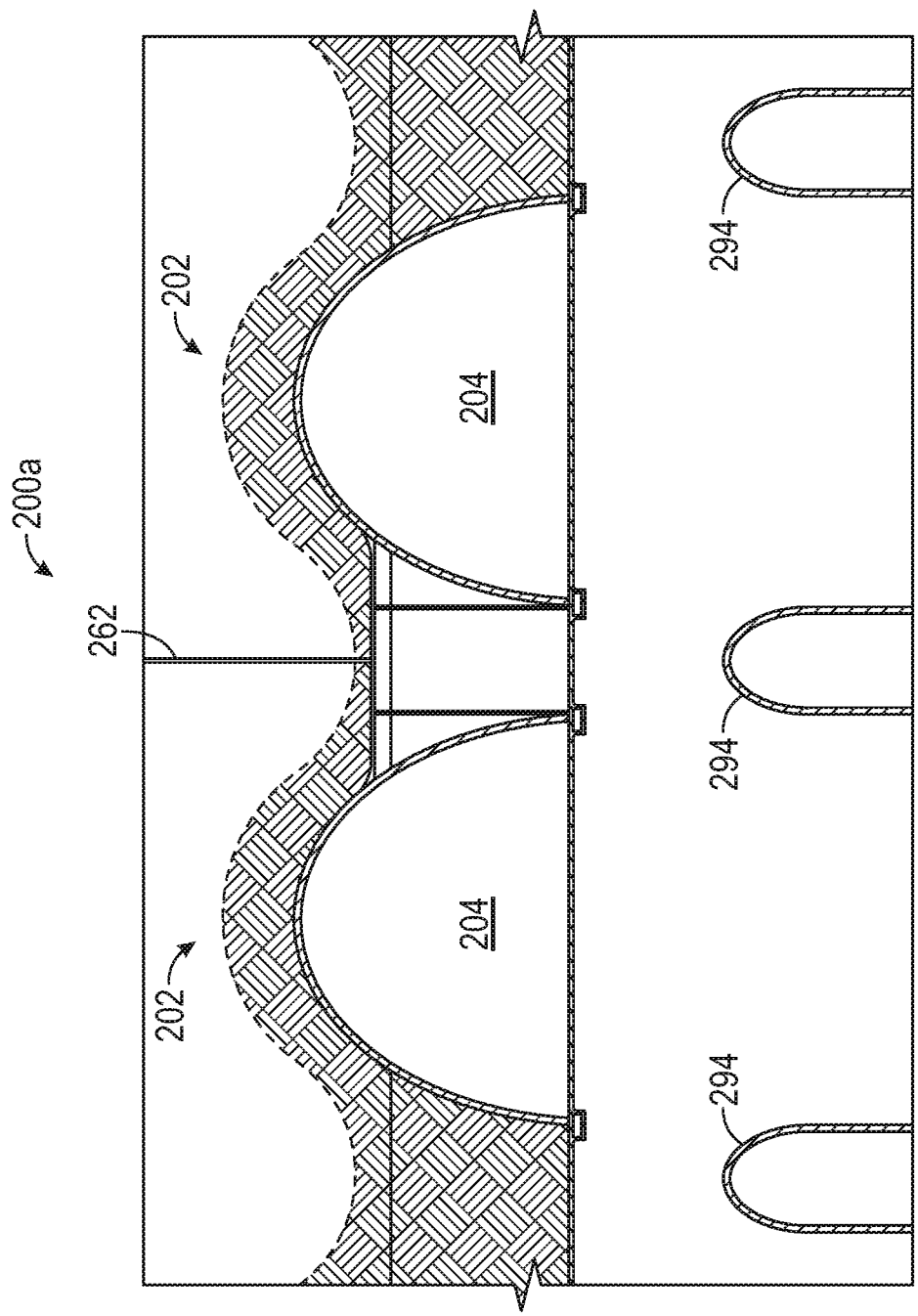

QUASI-EQUILIBRIUM ATMOSPHERIC MODULAR THERMODYNAMIC SYSTEM AND METHOD

CROSS REFERENCE TO RELATED APPLICATIONS

The present application claims priority to and claims the benefit of U.S. Provisional Patent Application Ser. No. 62/693,763, filed on Jul. 3, 2018, which is hereby incorporated by reference in its entirety.

FIELD OF THE DISCLOSURE

The disclosure generally relates to methods and systems that control an enclosed atmosphere in a facility in a quasi-equilibrium state. More particularly the disclosure relates to a controlled atmosphere system and control of internal atmospheric conditions of layered-cell enclosed areas based on internal and external conditions and/or future conditions. Control of the internal atmospheric conditions may be predictive control based at least in part on predictive analysis of future conditions. The disclosed systems and methods have many uses including, but not limited to, disaster preparedness, protection in a disaster, crop production, controlled storage, and computer-bank and/or server-bank temperature control.

BACKGROUND

Controlling an internal atmosphere to maintain or change conditions, such as temperature, humidity, and pressure, within a building can be difficult, resource intensive, and costly. Changes in the temperature and other conditions in the environment outside of the building can cause variations in the atmosphere within the building. Conventionally, cooling and heating systems react after changes take effect within the building, do not take into account changes occurring in the external environment, are slow to counter changes taking effect within the building, and may have a lack of precision of condition control. For example, U.S. Pat. No. 6,706,313, entitled "Facility for Maintaining an Item in a Controlled Environment", that issued Jun. 20, 2000, disclosed a method of introducing an item into an enclosed storage space separated from an interior of a first thermal mass layer by a vessel formed of a heat conductive material, in which the exterior of the first thermal mass layer is thermally isolated and regulated to control the temperature in the enclosed storage space. The system of the U.S. Pat. No. 6,706,313 Patent was a reactive system that regulated internal conditions only after the conditions changed.

Also, typically, buildings were provided with insulation disposed on the walls and ceiling to thermally insulate stored items from the atmosphere exterior to the storage building so that the temperature in the enclosed storage space could be controlled. However, the insulation was not disposed on the walls and ceiling in a uniform manner. This led to the formation of random hot and cold areas on the walls and ceiling of the buildings. These random hot and cold areas caused condensation to form on the walls and ceilings of the buildings, which then harmed items which were being stored in the buildings.

Additionally, disaster response and preparedness systems and methods are lacking. For example, when a hurricane made landfall in Texas in 2017 it knocked out power to a chemical plant. Resulting flooding then also knocked out emergency backup power, causing the plant to lose its ability to refrigerate 19.5 tons of volatile chemicals. As a result, the chemicals combusted, equipment was destroyed, residents around the plant were forced to evacuate, and pollutants were released into the atmosphere Therefore, what is needed is a controlled atmosphere system in which the internal atmosphere is controlled on a micro level to maintain conditions of the atmosphere at predetermined levels. Further, predictive control, such as predictive control using machine learning and/or artificial intelligence, may be advantageous to control internal atmospheric conditions. Additionally, improved disaster prediction, response, and/or shelter are needed.

SUMMARY

Methods and systems are disclosed for quasi-equilibrium control of an atmosphere within an enclosed space. For purposes of this disclosure, the term quasi-equilibrium means near to, but not exactly in, balance, such that a desired state of the internal atmosphere is maintained within predetermined ranges for internal atmospheric conditions, by creating a structure that maintains the internal atmosphere in a near-neutral state, and implementing incremental and, typically, small changes to maintain the neutral state before, or concurrent with, the internal atmospheric conditions are impacted by factors internally and/or externally. The problems of atmospheric condition swings and high energy and high cost responses to those condition changes are addressed through a controlled atmosphere system and control of internal atmospheric conditions of layered-cell storage areas based on internal and external conditions and/or future conditions. Control of the internal atmospheric conditions may be predictive control based at least in part on predictive analysis of future conditions. The system may predict the effects of the external environment on the internal atmosphere and may begin making changes to conditions in the internal atmosphere (such as, for example, temperature, humidity, pressure, etc.) before conditions change beyond a predetermined range, so as to keep the conditions within the predetermined range.

In some embodiments, the methods and systems may use engineering system models to predict the behavior (that is, the response) of the controlled atmosphere system based on predicted external environmental conditions in the future. The methods and systems may control one or more of the components of the controlled atmosphere system in order to maintain a neutral, substantially unchanging, state of the atmosphere in an enclosed area within the controlled atmosphere system.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings:

FIG. 7A is a schematic cross-sectional diagram of another exemplary embodiment of a controlled atmosphere cell system in accordance with the present disclosure.

FIG. 7B is a schematic cross-sectional diagram of another exemplary embodiment of a controlled atmosphere cell system in accordance with the present disclosure.

FIG. 7C is a schematic cross-sectional diagram of another exemplary embodiment of a controlled atmosphere cell system in accordance with the present disclosure.

DETAILED DESCRIPTION

Figure 1:
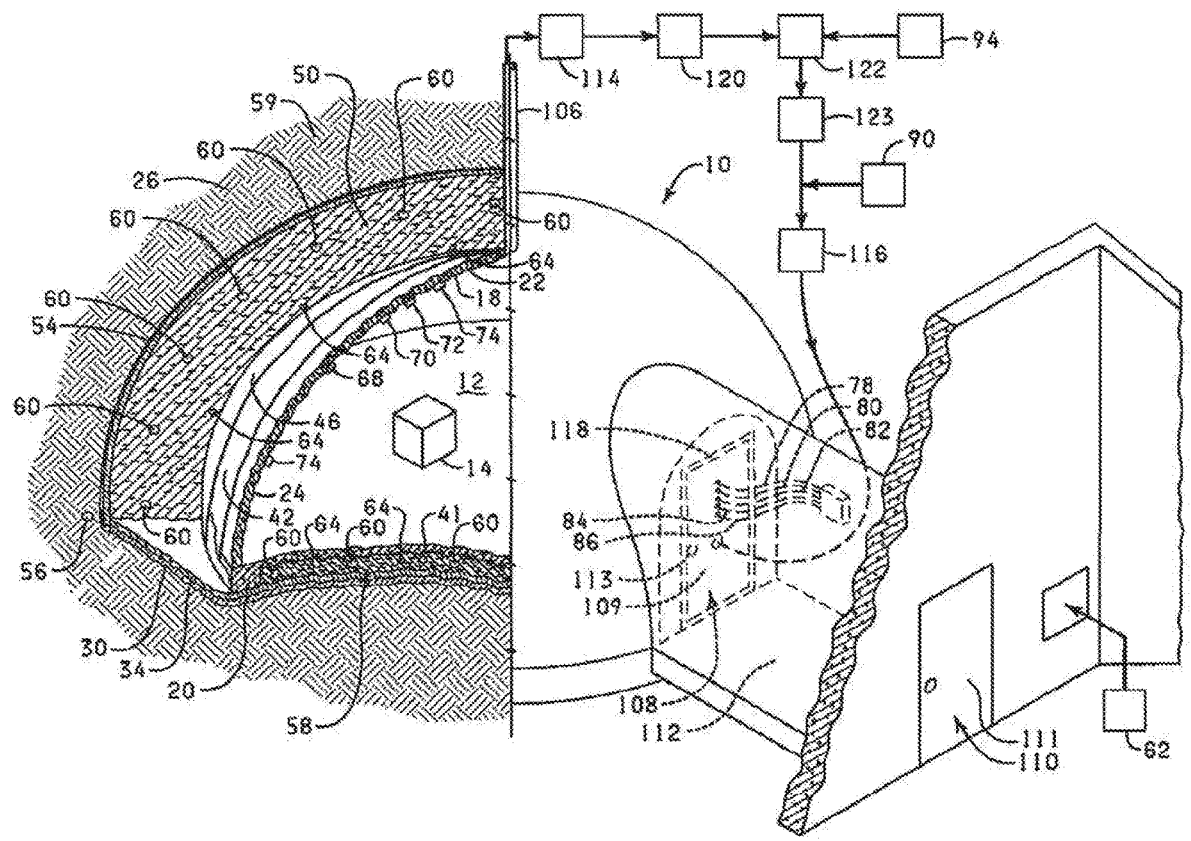
FIG. 1 is a partial cross-sectional, fragmental, perspective view of an exemplary embodiment of a facility constructed in accordance with the present disclosure.

The following detailed description refers to the accompanying drawings. The same reference numbers in different drawings may identify the same or similar elements.

The mechanisms proposed in this disclosure circumvent the problems described above. The present disclosure describes system and methods that control the atmosphere within an enclosed cell in a quasi-equilibrium thermal energy state. In one embodiment, a controlled atmosphere system may comprise a cell having a top, a bottom, and one or more wall extending between the top and the bottom defining an enclosed area inside the cell, wherein the top and the one or more wall comprise: a first layer formed of concrete and having a plurality of energy-transfer tubing embedded in the concrete, a second layer positioned on the outside of the first layer and comprising a sealant material, a third layer positioned on the outside of the second layer and comprising an aerated substrate material, and a fourth layer positioned on the outside of the third layer and comprising a moisture and gas impermeable material; a heating/cooling unit connectable to the energy-transfer tubing embedded in the concrete of the first layer of the cell to control temperature of the first layer and thereby control the temperature of an atmosphere of the enclosed area inside the cell; and one or more sensor within the enclosed area of the cell configured to monitor the atmosphere within the enclosed area; and one or more computer processor configured to receive input from the one or more sensor indicative of a state of the atmosphere within the enclosed area within the cell, to receive input regarding environmental conditions outside of the cell, and to control operation of the heating/cooling unit based on the received input from the one or more sensor and/or the received input regarding environmental conditions outside of the cell.

In one embodiment, a method for controlling an atmosphere in a storage system may comprise monitoring, with one or more sensors, conditions of an atmosphere in an enclosed area of a cell, the cell having a top, a bottom, and one or more wall extending between the top and the bottom defining the enclosed area inside the cell, wherein the top and the one or more wall comprise: a first layer formed of concrete and having a plurality of energy-transfer tubing embedded in the concrete, a second layer positioned on the outside of the first layer and comprising a sealant material, a third layer positioned on the outside of the second layer and comprising an aerated substrate material, and a fourth layer positioned on the outside of the third layer and comprising a moisture and gas impermeable material; receiving, with one or more computer processor, input from the one or more sensors indicative of conditions of the atmosphere within the enclosed area within the cell; receiving, with the one or more computer processor, input regarding environmental conditions outside of the cell; and controlling, with the one or more computer processor, operation of a heating/cooling unit connectable to the energy-transfer tubing embedded in the concrete of the first layer of the cell to control temperature of the first layer, based on the received input from the one or more sensors and the received input regarding environmental conditions outside of the cell, thereby modifying one or more of the conditions of the atmosphere of the enclosed area inside the cell. In one embodiment, the method may further comprise controlling, with the one or more computer processor, operation of the heating/cooling unit based on the received input from the one or more sensors and the received input regarding environmental conditions outside of the cell based on predicting, with the one or more computer processor, effects of future environmental conditions outside of the cell on the conditions of the atmosphere of the enclosed area in the cell using one or more of artificial intelligence, machine learning, and neural networks.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Methods and systems are disclosed for quasi-equilibrium control of an atmosphere within an enclosed space (which may be referred to herein as the internal atmosphere). The problem of internal atmospheric condition swings and high energy and high cost responses to those condition changes are addressed through a layered-cell controlled-atmosphere system and control of internal atmospheric conditions based on internal and external conditions and/or future conditions. Control of the internal atmospheric conditions may be predictive control based at least in part on predictive analysis of future conditions.

Figure 2:
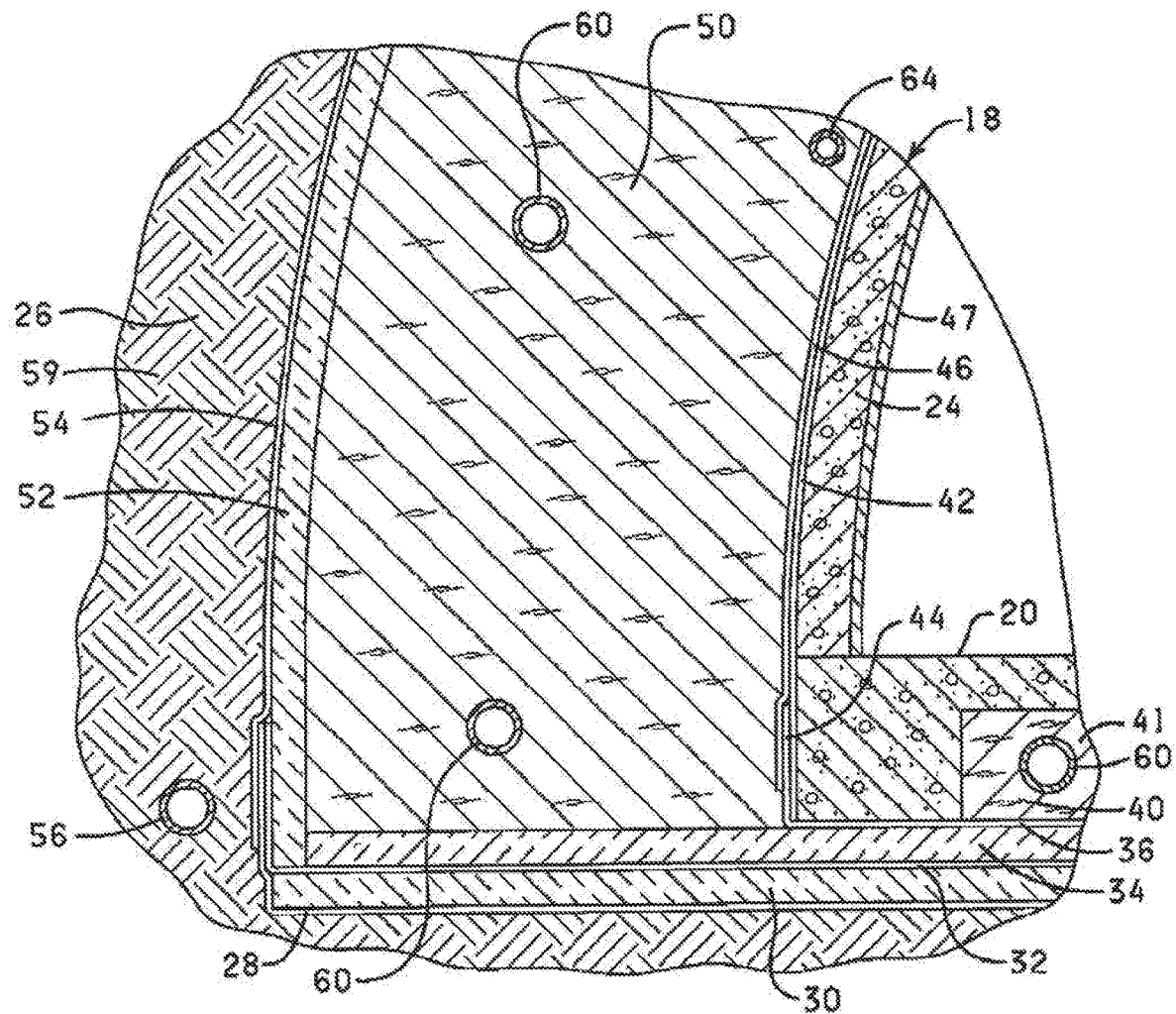
FIG. 2 is an enlarged, partial cross-sectional view of a portion of the facility depicted in FIG. 1.

Referring now to the drawings and more particularly to FIGS. 1 and 2, shown therein and designated by the general reference numeral 10 is a facility defining an enclosed storage space 12 adapted to receive items 14 for maintaining the items 14 in a controlled environment for extended periods of time. The facility 10 can be a building adapted to store, produce, grow, and/or process the items 14. The items 14 can be delicate items such as fruits, vegetables, grains, meats, film, cut flowers, animal waste, chemicals, fungus, dairy products, and combinations thereof, for example.

The facility 10 includes a vessel 18 which is formed of a heat conductive material, such as plasticized concrete, or any other suitable blend of concrete. The vessel 18 includes a foundation 20, a top wall 22, and at least one sidewall 24 extending between the foundation 20 and the top wall 22.

The foundation 20, the sidewall 24 and the top wall 22 cooperate to define the enclosed storage space 12 which is adapted to receive the items 14 to be stored as previously discussed. In the embodiment of the vessel 18 which is shown in FIG. 1, the vessel 18 is shaped in the form of a dome, and the top wall 22 and the sidewall 24 are integrally formed to form a unitary structure. The vessel 18 can be constructed in a manner disclosed in U.S. Pat. No. 4,488,392, titled "UNDERGROUND HOUSE AND CONSTRUCTION METHOD", issued on Dec. 18, 1984, which disclosure is hereby expressly incorporated herein by reference.

In one embodiment, before the vessel 18 is constructed, an opening is excavated in the earth 26. The earth 26 and the material removed during excavation of the opening in the earth 26 can be pushed aside so that it later can be utilized in the construction of the facility 10.

As shown in detail in FIG. 2, a first plastic sheet 28 may be disposed on the earth 26 in the excavated opening. A first layer of insulation 30 may be disposed on top of the first plastic sheet 28. A second plastic sheet 32 may be disposed on the first layer of insulation 30 and substantially covers the first layer of insulation 30. A second layer of insulation 34 may be disposed on top of the second plastic sheet 32 and substantially covers the second plastic sheet 32 thereof. A third plastic sheet 36 may be disposed on the second layer of insulation 34. The first, second and third plastic sheets 28, 32 and 36 can be an industrial grade of plastic sheeting. The first and second layers of insulation 30 and 34 can be constructed of board insulation.

The foundation 20 of the vessel 18 may be disposed on the third plastic sheet 36. The foundation 20 of the vessel 18 can be a poured concrete floor slab adapted to support the top wall 22 and the sidewall 24.

The foundation 20 is provided with an inverted u-shaped cross section so as to form a cavity 40. The cavity 40 is enclosed by the foundation 20 and the third plastic sheet 36. The cavity 40 is filled with a thermal mass layer 41. In one embodiment, the thermal mass layer 41 can be soil or sand, which has had substantially all of the moisture removed therefrom to decrease the coefficient of thermal transfer. The thermal mass layer 41 can have a thickness of at least about eight inches.

Once the vessel 18 is positioned on the third plastic sheet 36, a first substance 42 may be applied to an exterior surface of the vessel 18 to seal the pores of the vessel 18 and to thereby form the vessel 18 into a gas impermeable barrier.

As shown in FIGS. 1 and 2, a portion 44 of the third plastic sheet 36 extends outwardly from the foundation 20 of the vessel 18. The portion 44 of the third plastic sheet 36 may be moved upwardly against the first substance 42 which was applied to the vessel 18. During construction of the facility 10, the portion 44 of the third plastic sheet 36 is maintained in this position by bonding the portion 44 to the first substance 42 on the vessel 18 via a suitable adhesive or cohesive, for example. A second substance 46 may be applied over the first substance 42, and the portion 44, substantially as shown in FIG. 2. The second substance 46 serves to waterproof the exterior of the vessel 18 and to form a gas impermeable barrier to permit a partial vacuum to be drawn in the enclosed storage space 12.

A third substance 47 (FIG. 2) can be applied to the interior of the vessel 18, if desired. The third substance 47 can be a material adapted to provide a liquid and/or gas impermeable barrier to permit the enclosed storage space 12 to be pressurized. For example, when the vessel 18 is formed of a concrete material, the third substance 47 can be a rubber polymer waterproofing membrane, such as Wall Guard brand rubber polymer obtainable from Low Guard Corporation located in Oak Creek, Wis., which permits the enclosed storage space 12 to be pressurized from about 120 to about 150 psi. It should be noted that the third substance 47 can be any material capable of lining the interior of the vessel 18 and that the particular material which is chosen as the third substance 47 typically depends on the type of item 14 to be stored, produced, grown and/or processed within the vessel 18. For example, the third substance 47 can be stainless steel, glass or ceramics when the items 14 to be stored are dairy products, chemicals or petroleum products.

In general, the type of material utilized to form the vessel 18 will depend on the type of item 14 intended to be stored within the facility 10. In one embodiment, the stored items 14 can be delicate items (as defined above) and the vessel 18 can be formed of a plasticized concrete, such as gunite or shot-crete, and/or any other suitable concrete blend. In this embodiment, the first substance 42 can be a substance capable of sealing the pores of the concrete, such as XYPEX brand concentrate obtainable from CCL, Incorporated located in Dallas, Tex. When the vessel 18 is formed of concrete as discussed, the second substance 46 can be a rubber polymer waterproofing membrane, such as Wall Guard brand rubber polymer obtainable from Low Guard Corporation located in Oak Creek, Wis. It should be noted that the vessel 18 serves to isolate the stored items 14 from the first and second substances 42 and 46 so that the chemicals in the first and second substances 42 and 46 are not transmitted to the stored items 14.

A thermal mass layer 50 substantially surrounds the sidewall 24 and the top wall 22 of the vessel 18 such that the vessel 18 separates the thermal mass layer 50 from the enclosed storage space 12. The thermal mass layer 50 serves to store a sufficient amount of energy to equalize the temperature of the thermal mass layer 50 and the vessel 18 and also acts as an energy barrier and thereby retards the flow of energy from the vessel 18 when energy is being added to the thermal mass layer 50 as will be discussed hereinafter. In one embodiment, the thermal mass layer 50 can be formed of a quantity of material capable of forming a thermal mass, such as dirt or sand, which has had substantially all of the moisture removed therefrom, if desired.

A third layer of insulation 52 may be provided on the exterior of the thermal mass layer 50 to substantially encompass and enclose the thermal mass layer 50. The third layer of insulation 52 thermally isolates the first thermal mass layer 50 and the vessel 18 from the atmosphere external to the third layer of insulation 52 thereof. The third layer of insulation 52 can be formed of Dow board, for example.

The first, second and third layers of insulation 30, 34 and 52 are sized so as to retain the energy within the thermal mass layers 41 and 50 at the desired levels or to substantially stop the influence of outside temperature changes. In any event, the first, second and third layers of insulation 30, 34 and 52 are sized and constructed to have a much lower coefficient of energy transfer therethrough as compared to the coefficient of energy transfer through the vessel 18.

A waterproofing layer 54 is provided over the third layer of insulation 52 to provide a liquid impermeable barrier around the third layer of insulation 52. In one embodiment, the waterproofing layer 54 can be a Delta-Drain brand waterproofing layer obtainable from Cosella Dorken of Beamsville, Ontario, Canada. As best shown in FIG. 2, the ends of the first plastic sheet 28 and the second plastic sheet 32 are tucked in between the third layer of insulation 52 and the waterproofing layer 54 so as to waterproof the underside of the facility 10 and to maintain the thermal mass layer 50 in its substantially dry state. To further aid in waterproofing the facility 10, a french drain 56 can be provided adjacent the waterproofing layer 54 to channel water or other fluids away from the facility 10, if desired. A pumping system (not shown) can also be connected to the french drain 56, if necessary.

It should be noted that the thermal mass layers 41 and 50 may cooperate to provide a substantially unitary first thermal mass layer 58 surrounding the entire vessel 18. The thermal mass layers 41 and 50 can be sized to obtain a desired retention of energy to stop or substantially dampen the effects of outside climatic changes.

The earth 26 may be then moved around the waterproofing layer 54 to substantially surround the facility 10. The earth 26 forms a second thermal mass layer 59 surrounding the facility 10.

One advantage of positioning the facility 10 below the surface of the earth 26 is that the earth 26 inherently serves to absorb and store large amounts of energy to dampen the effects of climatic changes in the atmosphere external to the earth 26. Also, the earth 26 serves to eliminate dynamic influences on the exterior of the facility 10 due to convection and sunshine thereby making the facility 10 more energy efficient.

Depending on the particular location on the earth 26 where the facility 10 is located, and the anticipated storage temperature within the facility 10, the facility 10 can be disposed between about three feet below the surface of the earth 26 to about twenty feet below the surface of the earth 26.

A plurality of energy transfer tubes 60 may be spatially disposed about uniformly throughout the thermal mass layers 41 and 50. The thermal mass layers 41 and 50 engage and support the energy transfer tubes 60. An energy transfer medium (not shown), such as air, water or a refrigerant material, is selectively circulated through the energy transfer tubes 60 via a first heating/cooling unit 62 (FIGS. 1 and 3) to selectively draw energy out of the thermal mass layers 41 and 50, or to selectively add energy to the thermal mass layers 41 and 50.

Figure 3:
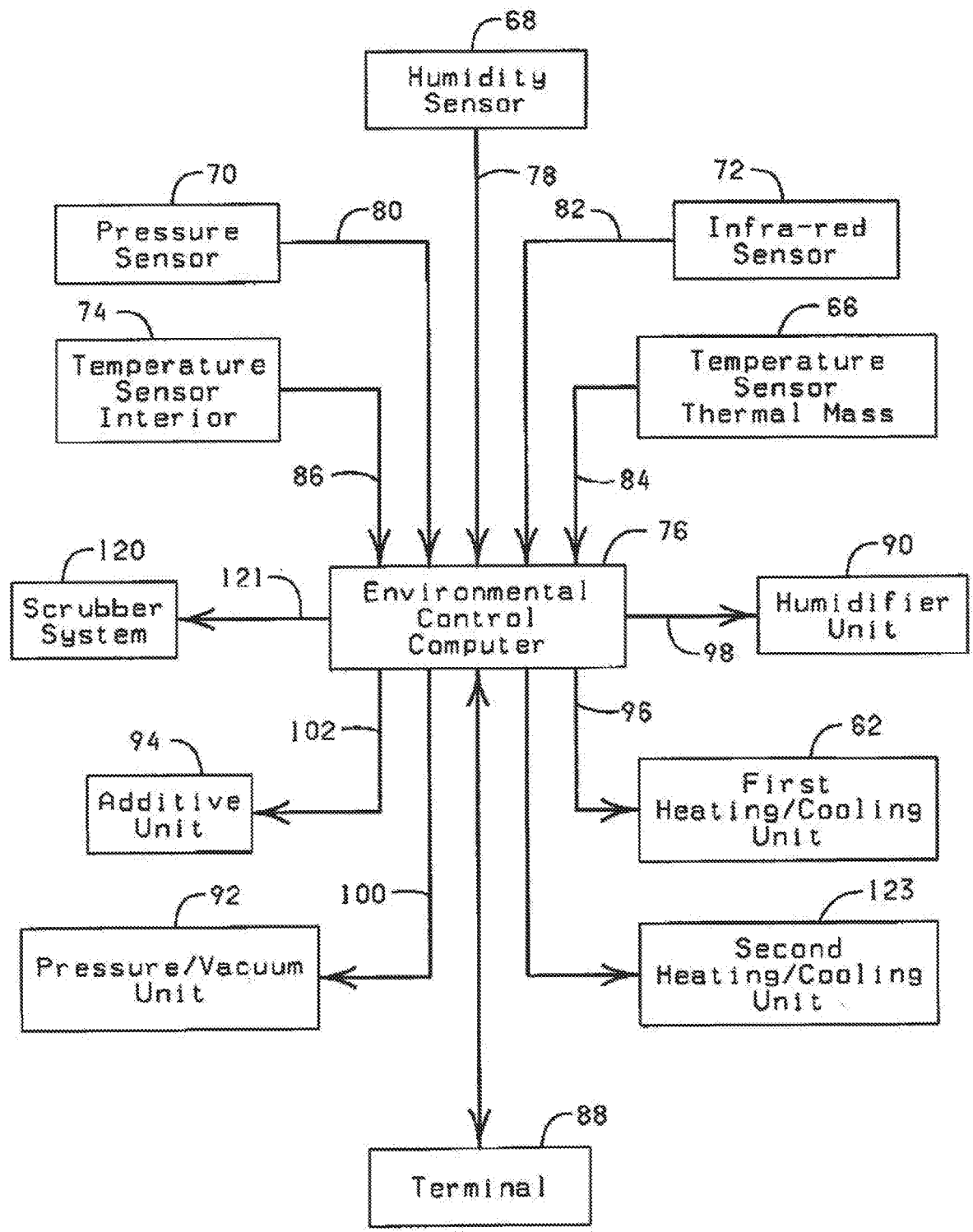
FIG. 3 is a schematic, diagrammatic view of an exemplary embodiment of a control system operating in accordance with the present disclosure.

The first heating/cooling unit 62 is shown diagrammatically in FIG. 3. The first heating/cooling unit 62 is desirably a compressed-air based vortex cooler such as those based on a vortex tube, water source heat pump, or other suitable heating/cooling unit which is environmentally friendly, yet effective to slowly change and/or maintain the temperature of the thermal mass layers 41 and 50. The first heating/cooling unit 62 may be a compressed-air based vortex cooler which can be obtained from ITW VORTEC of Cincinnati, Ohio.

Ideally, the first heating/cooling unit 62 and the thermal mass layers 41 and 50 are sized such that the temperature of the thermal mass layers 41 and 50 can be so slowly adjusted that the temperature of the vessel 18 also closely follows the temperature of the thermal mass layers 41 and 50. For example, the inherent lag time for adjusting the temperature of the thermal mass layers 41 and 50 can be increased by increasing the size of the thermal mass layers 41 and 50 and/or decreasing the size of the first heating/cooling unit 62. Likewise, the inherent lag time for adjusting the temperature of the thermal mass layers 41 and 50 can be decreased by decreasing the size of the thermal mass layers 41 and 50 and/or increasing the size of the first heating/cooling unit 62. The thickness of the thermal mass layers 41 and 50 depends on the heat transfer coefficient of the particular material utilized in forming the thermal mass layers 41 and 50. In one embodiment when the thermal mass layers 41 and 50 are constructed of soil and/or sand, the thermal mass layer 41 can have a thickness of at least eight inches, and the thermal mass layer 50 can have a thickness of at least twelve inches.

A plurality of sensor tubes 64 may be also spatially disposed about uniformly throughout the thermal mass layers 41 and 50. The sensor tubes 64 may be sized and dimensioned to receive thermal mass temperature sensors 66 therein so that the temperature of the thermal mass layers 41 and 50 can be monitored. Only one thermal mass temperature sensor 66 is shown diagrammatically in FIG. 3 for purposes of clarity. A cable (not shown) can be connected to the thermal mass temperature sensors 66 to selectively move the thermal mass temperature sensors 66 through the sensor tubes 64 and thereby obtain temperature readings from various locations within the thermal mass layers 41 and 50. The thermal mass temperature sensors 66 can be thermocouples.

A humidity sensor 68 may be disposed on the interior of the sidewall 24 of the vessel 18, to communicate with the storage space 12 enclosed within the vessel 18. A pressure sensor 70, infrared sensor 72 and a plurality of interior temperature sensors 74 may all be disposed on the sidewall 24 and/or the top wall 22 of the vessel 18 to also communicate with the storage space 12 enclosed within the vessel 18. The interior temperature sensors 74 are spaced around the vessel 18 so that the temperature exchange between the storage space 12 and the vessel 18 can be monitored. The outputs of the humidity sensor 68, pressure sensor 70, infrared sensor 72, thermal mass temperature sensors 66 and the interior temperature sensors 74 may be input into an environmental control computer 76 via respective signal paths 78, 80, 82, 84 and 86. Only one of the interior temperature sensors 74 is shown in FIG. 3 for purposes of clarity.

The infrared sensor 72 serves to detect and/or monitor hot and cold areas in the vessel 18. The environmental control computer 76 is programmed such that upon receipt of a signal indicative of a hot and/or cold area from the infrared sensor 72, the environmental control computer 76 outputs signals to suitable devices so as to cool the hot areas and/or warm the cold areas so as to maintain the entire enclosed storage space 12 at a constant predetermined temperature. For example, the environmental control computer 76 can selectively actuate a gas release valve (not shown) to permit warm gasses to escape from the enclosed storage space 12, and/or the environmental control computer 76 can actuate a director (not shown) to direct a cooled or warmed air stream at the hot and/or cold areas.

A terminal 88 may be provided to permit an operator to input predetermined environmental conditions into the environmental control computer 76 and to monitor the actual environmental conditions within the facility 10. The environmental control computer 76 receives the signals transmitted on the signal paths 78, 80, 82, 84 and 86, and in response thereto, the environmental control computer 76 is programmed to selectively output signals to the first heating/cooling unit 62, a humidifier unit 90, a pressure/vacuum unit 92 and an additive unit 94 via respective signal paths 96, 98, 100 and 102.

For example, if the humidity within the storage space 12 enclosed within the vessel 18 (as indicated by the humidity sensor 68) falls below a predetermined limit stored in the environmental control computer 76, the environmental control computer 76 outputs a signal over the signal path 98 to the humidifier unit 90 to increase the humidity in the vessel 18. Likewise, if the pressure in the storage space 12 within the vessel 18 (as indicated by the pressure sensor 70) falls below a predetermined limit stored in the environmental control computer 76, the environmental control computer 76 is programmed to output a signal over the signal path 100 to the pressure/vacuum unit 92 to increase the pressure in the vessel 18.

The pressure/vacuum unit 92 is shown in more detail in FIG. 1. A first tube 106 is disposed through the waterproofing layer 54, the third layer of insulation 52, the thermal mass layer 50 and the top wall 22 of the vessel 18 such that the first tube 106 communicates with the storage space 12 enclosed within the vessel 18.

The vessel 18 forms a first door receiving opening 108 sized and adapted to matingly receive a first door 109 therein. The first door 109 can be supported by hinges and selectively moved into and out of the first door receiving opening 108 to provide access to the enclosed storage space 12. The first door 109 can be constructed of a rigid material, such as steel. The vessel 18 forms a second door receiving opening 110 sized and adapted to matingly receive a second door 111 therein. The second door receiving opening 110 is spaced a distance from the first door receiving opening 108 by an entranceway 112. The second door 111 can be supported by hinges and selectively moved into and out of the second door receiving opening 110 to provide access to the entranceway 112.

A second tube 113 is disposed through the first door 109 such that the second tube 113 communicates with the storage space 12 enclosed within the vessel 18.

The pressure/vacuum unit 92 is provided with a first pump 114 and a second pump 116. The first pump 114 communicates with the first tube 106 and functions to draw gases out of the storage space 12 enclosed within the vessel 18. The second pump 116 communicates with the second tube 113 and functions to move gases into the storage space 12 enclosed within the vessel 18. As shown in FIG. 1, the first and second pumps 114 and 116 are disposed outside of the vessel 18 so that heating of the items 14 in the storage space 12 by the heat produced by the motors within the first and second pumps 114 and 116 is kept to a minimum.

It should be noted that the first door 109 is sealed in the door receiving opening 108 of the vessel 18 via a seal 118 to provide a gas and fluid impermeable barrier therebetween. The seal 118 is shown in dashed lines in FIG. 1. The seal 118 can be an inflatable seal obtainable from Seal Master Corporation of Kent, Ohio.

The first pump 114 and the second pump 116 are controlled by the environmental control computer 76 via the signal path 100. By changing the pumping speed of the first pump 114 relative to the second pump 116, the pressure within the storage space 12 enclosed within the vessel 18 can be increased or decreased. That is, if the pumping speed of the first pump 114 is greater than the pumping speed of the second pump 116, the pressure within the vessel 18 is decreased, which is desirable in some applications. Likewise, if the pumping speed of the first pump 114 is less than the pumping speed of the second pump 116, the pressure in the vessel 18 is increased, which is also desirable in some applications.

It should be noted that the first substance 42, the second substance 46, and the third plastic sheet 36 cooperate to form a gas and fluid impermeable barrier to prevent the release and/or entrance of gases and/or fluids into the vessel 18.

The composition of the gas within the storage space 12 enclosed within the vessel 18 is constantly changing as the stored items 14 naturally respirate. The gas received by the first pump 114 is pumped into a scrubber system 120 to control the gas mixture. The scrubber system 120 receives predetermined gas mixture parameters from the environmental control computer 76 via a signal path 121. After the gas drawn from the storage space 12 passes through the scrubber system 120, the gas is stored in a gas storage system 122.

Various additives can be added to the gas stored in the gas storage system 122 via the additive unit 94. For example, additives which change or enhance the smell, taste or vitamin content of the stored items 14 can be injected into the gas storage system 122, or additives, such as fumigants can be injected into the gas storage system 122 to control any rodents or pests which are located within the vessel 18. These additives can be recovered and reused, if desired, by a suitable gas recovery system.

A second heating/cooling unit 123 selectively draws gas out of the gas storage system 122. The heated or cooled gas is passed through the humidifier unit 90 to add humidity to, or take humidity away from the heated or cooled gas. The second pump 116 then injects the gas through the second tube 113.

It should be noted that the signal paths 78, 80, 82, 84 and 86 may pass through the first door 109 via gas and fluid-tight adapters (not shown). The first tube 106 and the second tube 113 also include seals (not shown) thereabout to assure a gas- and fluid-tight seal. Thus, the entire vessel 18 can be sealed to form a structure capable of storing large amounts of compressed gas and capable of retaining a partial vacuum pulled in the enclosed storage space 12.

The facility 10 may also be provided with a second heating/cooling unit 123 for controlling the temperature of the gasses entering the enclosed storage space 12 through the second tube 113.

The operation of the facility 10 will now be discussed. Initially, the predetermined environmental condition parameters, such as humidity, temperature, pressure, and gas content are entered into the environmental control computer 76 via the terminal 88. Upon receipt of the environmental condition parameters, the environmental control computer 76 outputs a signal to the first heating/cooling unit 62 to adjust the temperature of the thermal mass layers 41 and 50 to a predetermined amount above or below the desired storage temperature when the items 14 introduced into the enclosed storage space 12 are at a temperature greater than or less than, respectively, the desired temperature so that the thermal energy stored in the items 14 will be respectively drawn into or away from the thermal mass layers 41 and 50 to equalize the temperature of the items 14 and the thermal mass layers 41 and 50 at the desired temperature.

For example, if the items 14 to be stored are potatoes having a temperature of 80 degrees Fahrenheit, and the desired storage temperature is 50 degrees Fahrenheit, the temperature of the thermal mass layers 41 and 50 may be adjusted to 48 degrees Fahrenheit so that upon introducing the potatoes into the enclosed storage space 12, the stored energy within the potatoes will be drawn into the thermal mass layers 41 and 50 to equalize the temperatures of the potatoes and the thermal mass layers 41 and 50 at 50 degrees Fahrenheit.

Once the temperature of the thermal mass layers 41 and 50 reaches the desired predetermined temperature, the first and second doors 109 and 111 are opened and the items 14 are introduced into the enclosed storage space 12 through the entranceway 112. The first and second doors 109 and 111 are then closed, and the seal 118 surrounding the first door 109 is inflated, if necessary, to seal the first door receiving opening 108.

The environmental control computer 76 then receives signals from the humidity sensor 68, interior temperature sensors 74 and the pressure sensor 70 to sense the initial environment of the enclosed storage space 12. The environmental control computer 76 then selectively sends signals to the pressure/vacuum unit 92 to actuate the first pump 114 and the second pump 116, to the scrubber system 120 to control the gas mixture, to the additive unit 94 to control the additives added to the gas mixture, to the humidifier unit 90 to control the humidity and the second heating/cooling unit 123 to control the temperature of the gas mixture.

Once it has been determined by the interior temperature sensors 74 and the thermal mass temperature sensors 66 that the temperatures of the stored items 14 and the thermal mass layers 41 and 50 have been equalized, the second heating/cooling unit 123 can be deactivated. Thereafter, the temperature of the thermal mass layers 41 and 50 is maintained at the predetermined temperature by the selective actuation and deactivation of the first heating/cooling unit 62. By maintaining the thermal mass layers 41 and 50 at the predetermined temperature, the temperatures of the vessel 18 and the stored items 14 are also maintained at the same predetermined temperature. Readings can be taken from the infrared sensor 72 to determine whether hot or cold areas exist on the vessel 18 or the items 14. The first heating/cooling unit 62 can direct fluids to suitable locations near any hot or cold areas to cool the hot areas or warm the cold areas. This substantially eliminates hot and cold areas on the vessel 18 or the items 14 thereby substantially eliminating the problems associated with condensation.

From the above description it is clear that the present invention is well adapted to attain the advantages mentioned herein as well as those inherent in the invention. The temperature, pressure, humidity, gas mixture and other associated environmental variables described herein can be automatically monitored and corrected within the vessel 18, without manual intervention if desired, so that a predetermined environment can be maintained within the vessel 18.

The applications for such a facility 10 are numerous. For example, funguses, such as rare mushrooms can be grown within the vessel 18, or delicate items, such as cut flowers, can be stored within the vessel 18. Entire robotic production lines for producing items 14 can be set up and maintained within the vessel 18. For example, the interior of the vessel 18 can be sterilized, a vacuum can be pulled if desired, and then semiconductor products can be grown or produced within the vessel 18. Pumps (not shown) can also be utilized to move the items 14 into and out of the vessel 18, if desired. By controlling both the temperature and the pressure within the vessel 18, the speed at which natural reactions, such as the conversion of organic material to petroleum or the conversion of animal waste to methane, can be enhanced.

Figure 4:
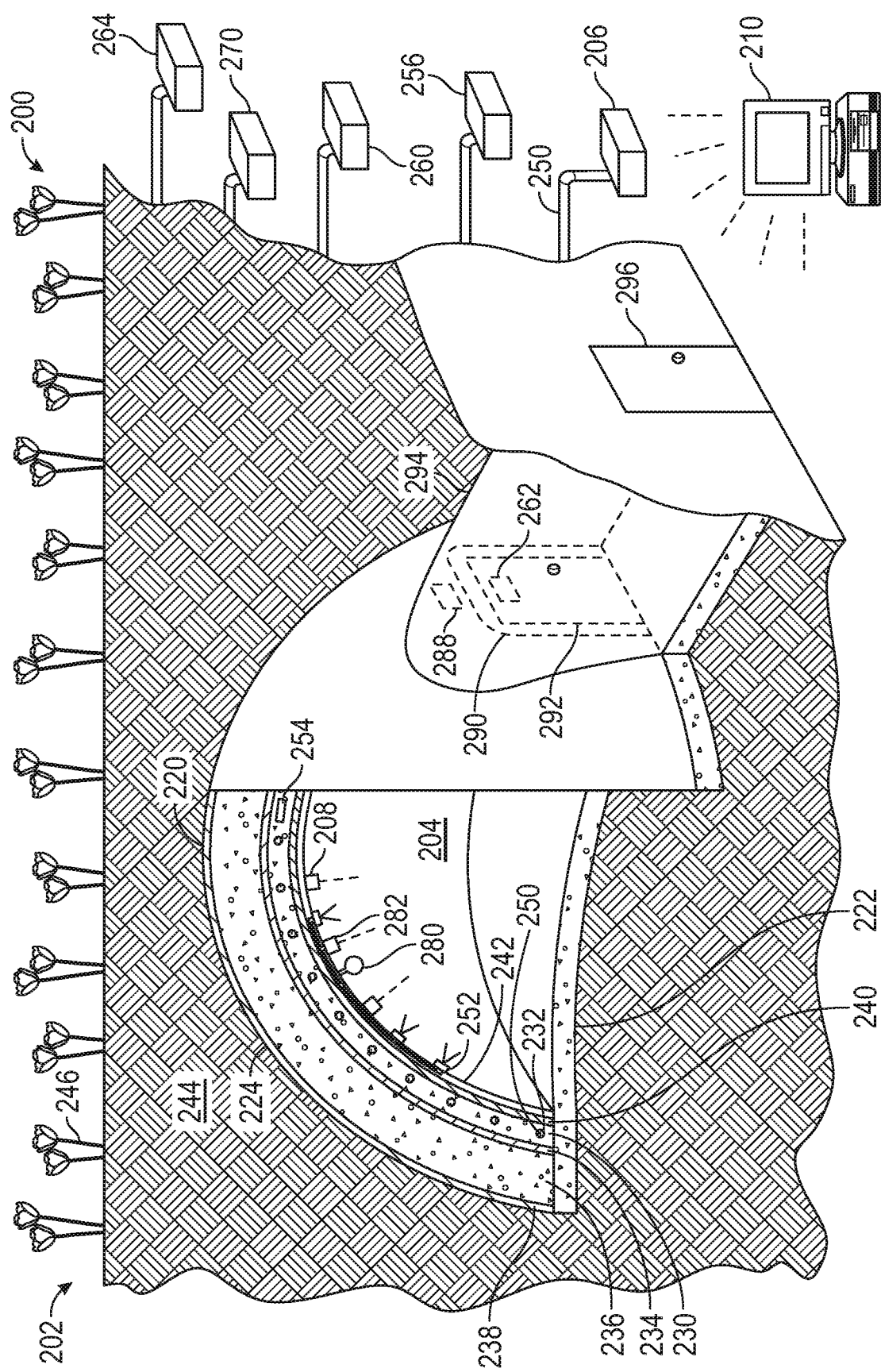
FIG. 4 is a schematic cross-sectional diagram of an exemplary embodiment of a controlled atmosphere system in accordance with the present disclosure.
Figure 5:
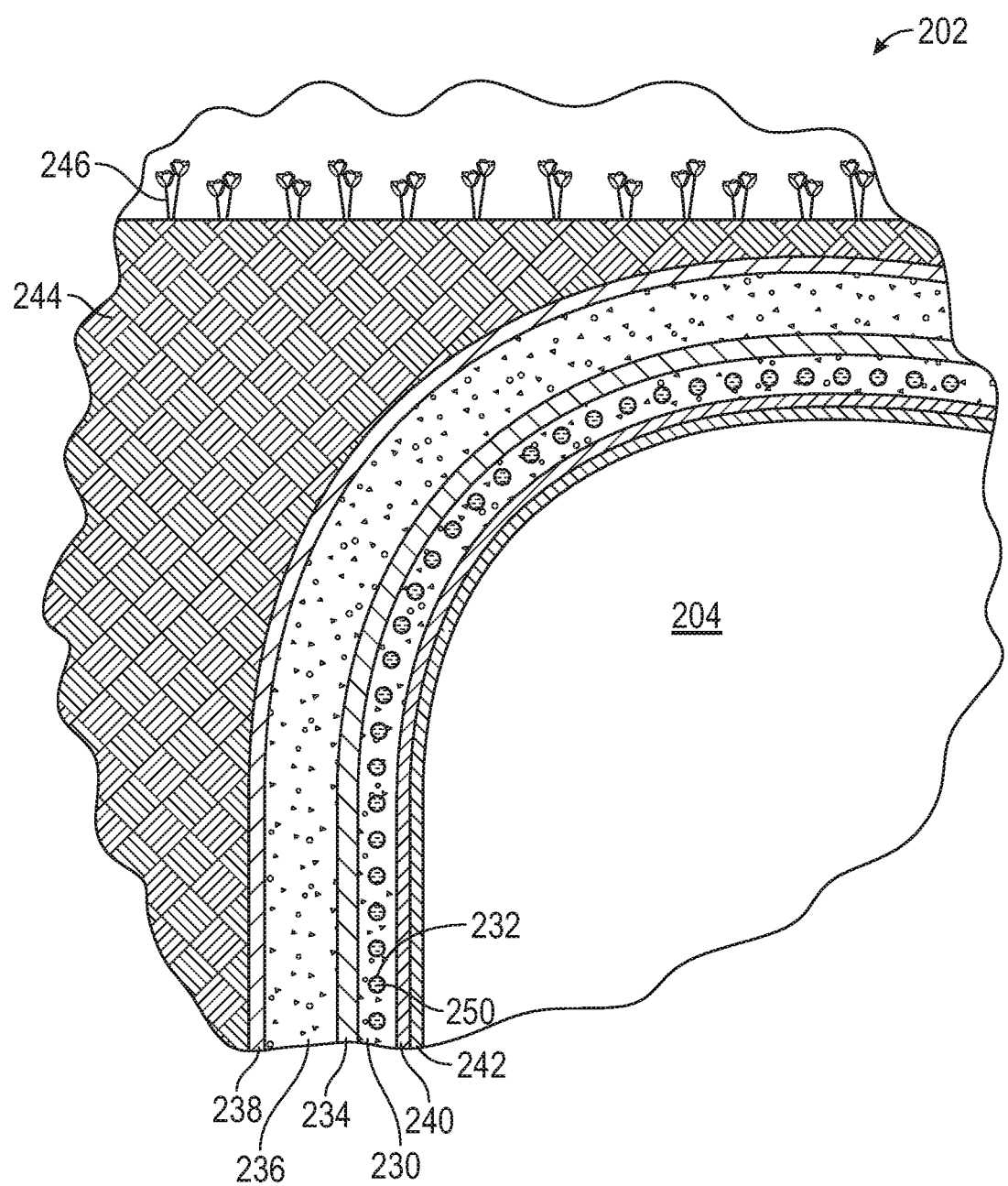
FIG. 5 is a schematic cross-sectional diagram of an exemplary embodiment of a portion of a cell of a controlled atmosphere system in accordance with the present disclosure.

Referring now to FIGS. 4 and 5, an exemplary embodiment in accordance with the present disclosure of a controlled atmosphere system 200 is shown. The controlled atmosphere system 200 may comprise a cell 202 enclosing an area 204 having an atmosphere; a heating/cooling unit 206 connectable to the cell 202 to control the temperature of the cell 202 and thereby control the temperature of the atmosphere of the enclosed area 204 inside the cell 202; one or more sensor 208 within the enclosed area 204 of the cell 202 configured to monitor the atmosphere within the cell 202; and one or more computer processor 210 configured to receive input from the one or more sensor 208 indicative of the state of the atmosphere within the enclosed area 204 within the cell 202, to receive input regarding environmental conditions outside of the cell 202, and to control operation of the heating/cooling unit 206 based on the received input from the one or more sensor 208 and/or the received input regarding the environmental conditions outside of the cell 202.

One or more components of the controlled atmosphere system 200 may be located partially or completely underground, above ground, or on the surface of the ground.

The cell 202 may have a top 220, a bottom 222, and one or more wall 224 extending between the top 220 and the bottom 222 defining the enclosed area 204 inside the cell 202. One or more of the top 220, the one or more wall 224, and the bottom 222 may be arched. In one embodiment, the top 220 and the one or more wall 224 may cooperate to form a dome. In one embodiment, the bottom 222 may be domed upward toward the top 220. In one embodiment, the top 220 and the one or more wall 224 may be integrally formed to form a unitary structure. In one embodiment, the top 220, the bottom 222, and the one or more wall 224 may be integrally formed to form a unitary structure. The top 220, the bottom 222, and the one or more wall 224 may cooperate to form a sealed structure such that the atmosphere of the enclosed area 204 may be precisely controlled.

In one embodiment, one or more of the top 220, the bottom 222, and the one or more wall 224 (alone or in combination) may be a thin shell structure. The thin shell structure may have a top 220 that has a first cross-sectional thickness and one or more walls 224 that have a second cross-sectional thickness that is larger than the first cross-sectional thickness of the top 220.

The top 220 and the one or more wall 224 may comprise a plurality of layers.

In one embodiment, the plurality of layers may act together to simulate the heat transfer properties of a layer of earth having a depth of fifteen to twenty feet.

In one embodiment, the top 220 and the one or more wall 224 may comprise a first layer 230 formed of concrete and having a plurality of energy-transfer tubing 232 embedded in the concrete; a second layer 234 positioned on the outside of the first layer 230 and comprising a sealant material; a third layer 236 positioned on the outside of the second layer 234 and comprising an aerated substrate material; and a fourth layer 238 positioned on the outside of the third layer 236 and comprising a moisture and/or gas impermeable material. In one embodiment, the sealant material of the second layer 234 may form a gas impermeable barrier.

In one embodiment, the top 220 and the one or more wall 224 may further comprise one or more of the following layers: a fifth layer 240 positioned on the inside of the first layer 230 and comprising a laminate material, a sixth layer 242 positioned on the inside of the fifth layer 240 and comprising a tubular sub-structure, a seventh layer 244 positioned on the outside of the fourth layer 238 and comprising earth, and an eighth layer 246 positioned on the outside of the seventh layer 244 and comprising vegetation. The outside of the outmost layer may be adjacent to the environment beyond the controlled atmosphere system 200 (that is, adjacent to the external atmosphere).

In one embodiment, the first layer 230 may be configured to store thermal energy and to transfer thermal energy to equalize the temperature of the first layer 230 and the atmosphere of the enclosed area 204. The first layer 230 may be configured to act as a thermal sink to pull thermal energy from the atmosphere of the enclosed area 204 and/or to act as a thermal energy source to provide thermal energy to the atmosphere of the enclosed area 204. In one embodiment, the first layer 230 may act as a machine for thermal heat transfer.

In one embodiment, the second layer 234 may act to seal the atmosphere of the enclosed area 204 from outside gasses, biological agents, pollutants, and/or other contaminants.

In one embodiment, the second layer 234 positioned on the outside of the first layer 230, the third layer 236 positioned on the outside of the second layer 234, and the fourth layer 238 positioned on the outside of the third layer 236 are configured and/or sized so as to retain the energy within the first layer 230 at the desired levels and/or to substantially reduce the influence of outside environmental conditions and/or changes on the first layer 230 (and thus on the atmosphere of the enclosed area 204). In one embodiment, the second layer 234, the third layer 236, and the fourth layer 238 have a lower coefficient of energy transfer as compared to the coefficient of energy transfer through the first layer 230.

In one embodiment, the first layer 230 may be formed of flexible concrete, also known as engineered cementitious concrete. Flexible concrete has a higher strain capacity than ordinary concrete. For example, flexible concrete may have a strain capacity in the range of approximately 3% to approximately 7%, compared to 0.01% for ordinary portland cement, paste, mortar or concrete. Flexible concrete is more ductile than other concrete. This ductility helps flexible concrete withstand higher levels of shaking, expansion, and forces that would result in the structural failure of ordinary concrete. As one non-exclusive example, the ductile properties of flexible concrete may increase the resistance to damage of the cell 202 from applied forces, such as those experienced in earthquakes.

In one embodiment, the first layer 230 may be formed of reinforced flexible concrete. The reinforced flexible concrete has more strength than concrete that is not reinforced. Flexible concrete and reinforced flexible concrete may be known as "specialty concrete."

In one embodiment, the plurality of energy-transfer tubing 232 embedded in the concrete of the first layer 230 of the cell 202 may be flexible tubing.

In one embodiment, the bottom 222 of the cell 202 may comprise one or more of the first layer 230, the second layer 234, the third layer 236, the fourth layer 238, the fifth layer 240, the sixth layer 242, and the seventh layer 244, as described above in conjunction with the top 220 and the one or more walls 224. In one embodiment, the bottom 222 of the cell 202 may be positioned on the surface of, or below the surface of, the earth.

The heating/cooling unit 206 may be connectable to the energy-transfer tubing 232 embedded in the concrete of the first layer 230 of the cell 202 to control the temperature of the first layer 230 and thereby control the temperature of the atmosphere of the enclosed area 204 inside the cell 202. In one embodiment, the heating/cooling unit 206 may be a reverse cycle chiller or air chiller that does not require a cooling tower. In one embodiment, the heating/cooling unit 206 may be a compressed-air based vortex cooler such as those based on a vortex tube, water source heat pump, or other suitable heating/cooling unit which is environmentally friendly. The heating/cooling unit 206 may be a compressed-air based vortex cooler which can be obtained from ITW VORTEC of Cincinnati, Ohio.

The composition of compressed-air based vortex coolers is well known to those having ordinary skill in the art and so will not be explained in detail herein. However, in general, compressed-air based vortex coolers utilize pressurized gas (or air) that is injected into a chamber and accelerated to a high rate of rotation to form a vortex. The outer, hotter, portion of gases of the vortex is allowed to escape while the inner, colder, portion of the gases of the vortex is forced in an inner vortex of reduced diameter and can be output at cooler temperatures than the original gas injection. The cooler gases can be used to exchange heat with other materials.

The energy-transfer tubing 232 may be used to transport one or more energy-transfer materials 250 to and from the heating/cooling unit 206 through the first layer 230. The one or more energy-transfer materials 250 may comprise one or more of a fluid (such as water or coolant), a purified gas or gas mix, and air. The energy-transfer material 250 may be heated or cooled by the heating/cooling unit 206.

As the energy-transfer material 250 moves through the energy-transfer tubing 232, energy may be transmitted between the energy-transfer material 250 in the energy-transfer tubing 232 and the first layer 230. The energy-transfer material 250 may cool or heat the first layer 230. For example, the energy-transfer material 250 may be cooled to a temperature less than the temperature of the first layer 230 such that heat is transferred from the first layer 230 to the energy-transfer material 250 as it moves through the first layer 230. Alternatively, the energy-transfer material 250 may be heated to a temperature more than the temperature of the first layer 230 such that heat is transferred from the energy-transfer material 250 to the first layer 230 as the energy-transfer material 250 moves through the first layer 230.

The material of the first layer 230 affects the temperature of the atmosphere of the enclosed area 204 by transferring heat from and to the atmosphere of the enclosed area 204, depending on the temperature of the atmosphere and the temperature of the first layer 230. In embodiments in which there are one or more additional layers between the first layer 230 and the atmosphere of the enclosed area 204, the heat is transferred through the additional layers.

The second layer 234, the third layer 236, and the fourth layer 238 may act to insulate the first layer 230 from the external environment, slowing the effect of the external environment on the first layer 230. The second layer 234 positioned on the outside of the first layer 230 and comprising the sealant material may prevent heat, gas, and/or moisture from passing between the first layer 230 and the third layer 236. In one embodiment, the second layer 234 may act as a reflective layer and reflect heat from the first layer 230 back into the first layer 230.

In one embodiment, the third layer 236 positioned on the outside of the second layer 234 and comprising the aerated substrate material may act as a retarding layer to insulate the first layer 230 from the external environment such that heat transfer is slowed between the external environment and the first layer 230 (and, thus, the atmosphere of the enclosed area 204). In one embodiment, the aerated substrate material may comprise soil mixed with an aggregate such that the third layer 236 contains air spaces which slow the movement of thermal energy through the third layer 236. The amount and type of aggregate may be based on the amount of heat transfer desired through the third layer 236. One non-exclusive example of an aggregate of the third layer 236 is perlite.

The fourth layer 238 positioned on the outside of the third layer 236 and comprising the moisture and gas impermeable material may be configured to prevent the transfer of moisture and gas between the third layer 236 and any additional outside layers (such as one or more of the seventh layer 244 positioned on the outside of the fourth layer 238 and comprising earth, and/or the eighth layer 246 positioned on the outside of the seventh layer 244 and comprising vegetation) and/or the external environment outside of the controlled atmosphere system 200.

In one embodiment, the seventh layer 244 may have a minimum depth of five feet. In one embodiment, the seventh layer 244 may have a depth in a range of approximately two feet to approximately twenty feet. In one embodiment, the depth of the seventh layer 244 may depend on the expected conditions of the external environment. For example, in more temperate climes with limited temperature extremes, the depth of the seventh layer 244 may be less than the depth of the seventh layer 244 in climes where large ranges of temperature are predicted.

In one embodiment, the vegetation of the eighth layer 246 may act to prevent erosion, control moisture, control reflectivity, and/or control heat transfer levels of the seventh layer 244, and/or other layers of the controlled atmosphere system 200, caused by the environment external to the controlled atmosphere system 200.

In one embodiment, the fifth layer 240 positioned on the inside of the first layer 230 and comprising laminate material may be configured such that the pressure of the atmosphere of the enclosed area 204 can be increased or decreased above or below external pressures. In one embodiment, the fifth layer 240 may be configured to allow pressurization of the atmosphere of the enclosed area 204 to a range of approximately 120 psi to approximately 150 psi. In one embodiment, the fifth layer 240 may comprise a liquid and/or gas impermeable barrier. In one embodiment, the fifth layer may comprise a rubber polymer waterproof membrane. One non-exclusive example of a rubber polymer waterproof membrane is produced by Low Guard Corporation, of Oak Creek, Wis. In one embodiment, the fifth layer 240 comprises one or more of stainless steel, glass, or ceramic.

In one embodiment, the fifth layer 240 comprises one or more material that is based on the purpose of the use of the enclosed area 204. For example, if the use of the enclosed area 204 is for shelter during a disaster, the fifth layer 240 may comprise a fire resistant and/or fire retardant material. As another example, if the use of the enclosed area 204 is for storing food or for medical applications, stainless steel may be used.

In one embodiment, the sixth layer 242 positioned on the inside of the fifth layer 240 and comprising the tubular sub-structure may be used to deliver one or more materials into the enclosed area 204 of the cell 202. The tubular sub-structure may comprise one or more delivery tubes 252.

The one or more sensors 208 within the enclosed area 204 of the cell are configured to monitor the atmosphere within the enclosed area 204. The one or more sensors 208 may comprise one or more of the following: a temperature sensor, a humidity sensor, a gas sensor, an infrared sensor, a pressure sensor, a contaminate sensor, and a biological agent sensor. It will be understood that the one or more sensor 208 may be any sensor that can determine conditions within the enclosed area 204. The one or more sensor 208 may include specific sensors based on the use of the enclosed area 204.

In one embodiment, the one or more sensors 208 may be configured to transmit sensor data wirelessly as input data to the one or more computer processor 210 and/or to additional monitoring devices (such as other computer processors including laptops, desktop computers, handheld computer devices, and/or smart phones/watches, and so on). The one or more sensors 208 may be configured to receive information wirelessly from the one or more computer processor 210 and/or the additional monitoring devices.

In one embodiment, the controlled atmosphere system 200 may further comprise one or more layer sensor 254 positioned within, or connected to, or in communication with, the first layer 230 and configured to sense the temperature of the first layer 230. The one or more layer sensor 254 may be configured to transmit temperature data regarding the first layer 230 to the one or more computer processor 210 and/or to the additional monitoring devices. The one or more layer sensor 254 may be a wireless temperature sensor and may transmit and/or receive data wirelessly. In one embodiment, the one or more layer sensor 254 may additionally or alternatively comprise sensors to monitor the structural integrity of the first layer 230 and/or the energy-transfer tubing 232.

In one embodiment, the controlled atmosphere system 200 may further comprise an enclosed-area heating/cooling unit 256. The enclosed-area heating/cooling unit 256 may be connected to the enclosed area 204 and may be configured to directly heat or cool the atmosphere in the enclosed area 204 of the cell 202. In one embodiment, the enclosed-area heating/cooling unit 256 may be a reverse cycle chiller or an air chiller. In one embodiment, the enclosed-area heating/cooling unit 256 may be a compressed-air based vortex cooler, such as previously described in relation to the heating/cooling unit 206.

In one embodiment, the enclosed-area heating/cooling unit 256 may be connected to the delivery tubes 252 of the sixth layer 242 such that heated or cooled are is delivered (and/or extracted) through the delivery tubes 252 to the enclosed area 204.

In one embodiment, the controlled atmosphere system 200 may further comprise one or more air compressor 260 connected to the enclosed area 204 of the cell 202. The air compressor 260 may be configured to pump air and/or other gas into the enclosed area 204 of the cell 202 to control the air pressure in the enclosed area 204. Additionally, or alternately, the enclosed-area heating/cooling unit 256 may be used to control the air pressure in the enclosed area 204.

The controlled atmosphere system 200 may further comprise one or more exhaust vents 262 and/or one or more pumps 264 connected to the enclosed area 204 of the cell 202 and configured to release and/or remove air and/or gas from the enclosed area 204 in a controlled manner to decrease the air pressure in the enclosed area 204 of the cell 202. In one embodiment, the controlled atmosphere system 200 may further comprise one or more scrubber and/or filter (not shown) configured to recycle and/or clean the air in the enclosed area 204. The air compressor 260, the exhaust vents 262, and/or the one or more pumps 264 and/or the one or more scrubber/filter may be controlled by the computer processor 210.

In one embodiment, the one or more air compressor 260, the one or more pump 264, and/or the one or more exhaust vents 262 may be used simultaneously or consecutively with the heating/cooling unit 206 and/or the enclosed-area heating/cooling unit 256 to further reduce or increase the temperature of the atmosphere in the enclosed area 204.

In one embodiment, the one or more air compressor 260, the one or more pump 264, and/or the one or more exhaust vents 262 may be connected to the delivery tubes 252 of the sixth layer 242 such that air and/or other gas may be delivered (and/or extracted) through the delivery tubes 252 to the enclosed area 204. In one embodiment, the one or more scrubber/filter may be connected to the delivery tubes 252.

In one embodiment, the controlled atmosphere system 200 may further comprise one or more humidity control unit 270 configured to increase and/or decrease the level of humidity in the atmosphere of the enclosed area 204. The humidity control unit 270 may be positioned within the enclosed area 204 or connected to the enclosed area 204. The humidity control unit 270 may be controlled by the computer processor 210. In one embodiment, the humidity control unit 270 is part of, or replaced by, the enclosed-area heating/cooling unit 256. In one embodiment, the one or more humidity control unit 270 may be connected to the delivery tubes 252 of the sixth layer 242 such that moisture may be delivered (and/or extracted) through the delivery tubes 252 to the enclosed area 204.

In one embodiment, the controlled atmosphere system 200 may further comprise lighting units 280 positioned within the enclosed area 204 of the cell 202. In one embodiment, the controlled atmosphere system 200 may further comprise growing controls 282 positioned within the enclosed area 204 of the cell 202. The growing controls 282 may be configured to aid in the growth of plants within the enclosed area 204. In one embodiment, the growing controls 282 comprise structure and/or controls for lighting, nutrients, and/or water to plants within the enclosed area 204.

In one embodiment, the controlled atmosphere system 200 may further comprise one or more french drain or other water management device (not shown) to channel water or other fluids away from the cell 202, if desired. A pumping system (not shown) may be connected to the french drain or other water management device.

The one or more computer processor 210 may include circuitry. The term circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, and/or the like.

The one or more computer processor 210 may be configured to receive (in any manner, including wirelessly or via wires) input data from the one or more sensors 208 indicative of the condition of the atmosphere within the enclosed area 204 within the cell 202. The one or more computer processor 210 may be configured to receive (in any manner, including wirelessly or via wires) input data from the one or more layer sensors 254 indicative of the temperature of the first layer 230. Further, the one or more computer processor 210 may be configured to receive (in any manner, including wirelessly or via wires) input regarding environmental conditions (including past, current, and/or forecasted conditions) outside of the cell 202. In one embodiment, the input regarding environmental conditions (including past, current, and/or forecasted conditions) outside of the cell 202 may be referred to as "climate injection" input 255.

The one or more computer processor 210 may control operation of the heating/cooling unit 206 based on the received input from the one or more sensor 208 and/or the one or more layer sensor 254 and/or the received input regarding the environmental conditions outside of the cell 202. In one embodiment, the computer processor 210 may control operation of one or more of the other components of the controlled atmosphere system 200 (such as the enclosed-area heating/cooling unit 256, the air compressor 260, the exhaust vents 262, the one or more pumps 264, and/or the humidity control unit 270) based on the received input from the one or more sensor 208 and/or the one or more layer sensor 254 and/or the received input regarding the environmental conditions outside of the cell 202.

In one embodiment, the one or more computer processor 210 may be configured to control operation of the one or more other components of the controlled atmosphere system (such as the one or more of the heating/cooling unit 206, the enclosed-area heating/cooling unit 256, the air compressor 260, the exhaust vents 262, the one or more pumps 264, and/or the humidity control unit 270) based on the received input from the one or more sensor 208 and/or the one or more layer sensor 254 and/or the received input regarding the environmental conditions outside of the cell 202 and/or based on predicting the effect of environmental conditions outside the cell 202 on the atmosphere in the enclosed area 204 within the cell 202.

In one embodiment, predicting the effect of environmental conditions outside the cell 202 on the atmosphere in the enclosed area 204 within the cell 202 may be based on the use of one or more of artificial intelligence, machine learning, and neural networks. In one embodiment, predicting the effect of environmental conditions outside the cell 202 on the atmosphere in the enclosed area 204 within the cell 202 may be based on the use of algorithms that mimic the human brain's behavior.

In one embodiment, predicting the effect of environmental conditions outside the cell 202 on the atmosphere in the enclosed area 204 within the cell 202 may be based on the use of algorithms that factor in continuously changing physical variables (such as temperature, for example) and the effect of other physical variables using automatic feedback control (the use of feedback information to correct and/or "train" the algorithms to continuously improve the output of the algorithms).

The one or more computer processor 210 may be configured to execute computer readable instructions, which may include algorithms, that use an engineering system model to predict the behavior (that is, the response) of the controlled atmosphere system 200 based on predicted environmental conditions outside the cell 202 in the future. The one or more computer processor 210 may be configured to execute computer readable instructions to carry out one or more procedure. The one or more computer processor 210 may be configured to execute computer readable instructions that control one or more of the other components of the controlled atmosphere system 200 in order to maintain a neutral, substantially unchanging, state of the atmosphere in the enclosed area 204.

In one embodiment, the one or more computer processor 210 may receive meteorological information and predictions for the external environment from external sources. Nonexclusive examples of external sources include the National Oceanic and Atmospheric Administration, from the National Weather Service, from the National Weather Center in Norman, Okla., from geographically local public meteorological sources, and/or from private meteorological information sources. In one embodiment, the controlled atmosphere system 200 may create meteorological information and predictions utilizing the one or more computer processor 210 executing computer readable instructions and/or information from one or more external sensors positioned in the external environment. The one or more computer processor 210 may execute such computer readable instructions utilizing one or more of, or combinations of, machine learning techniques, artificial intelligence techniques, neural network techniques, system modeling techniques, and/or predictive algorithms.

Figure 6:
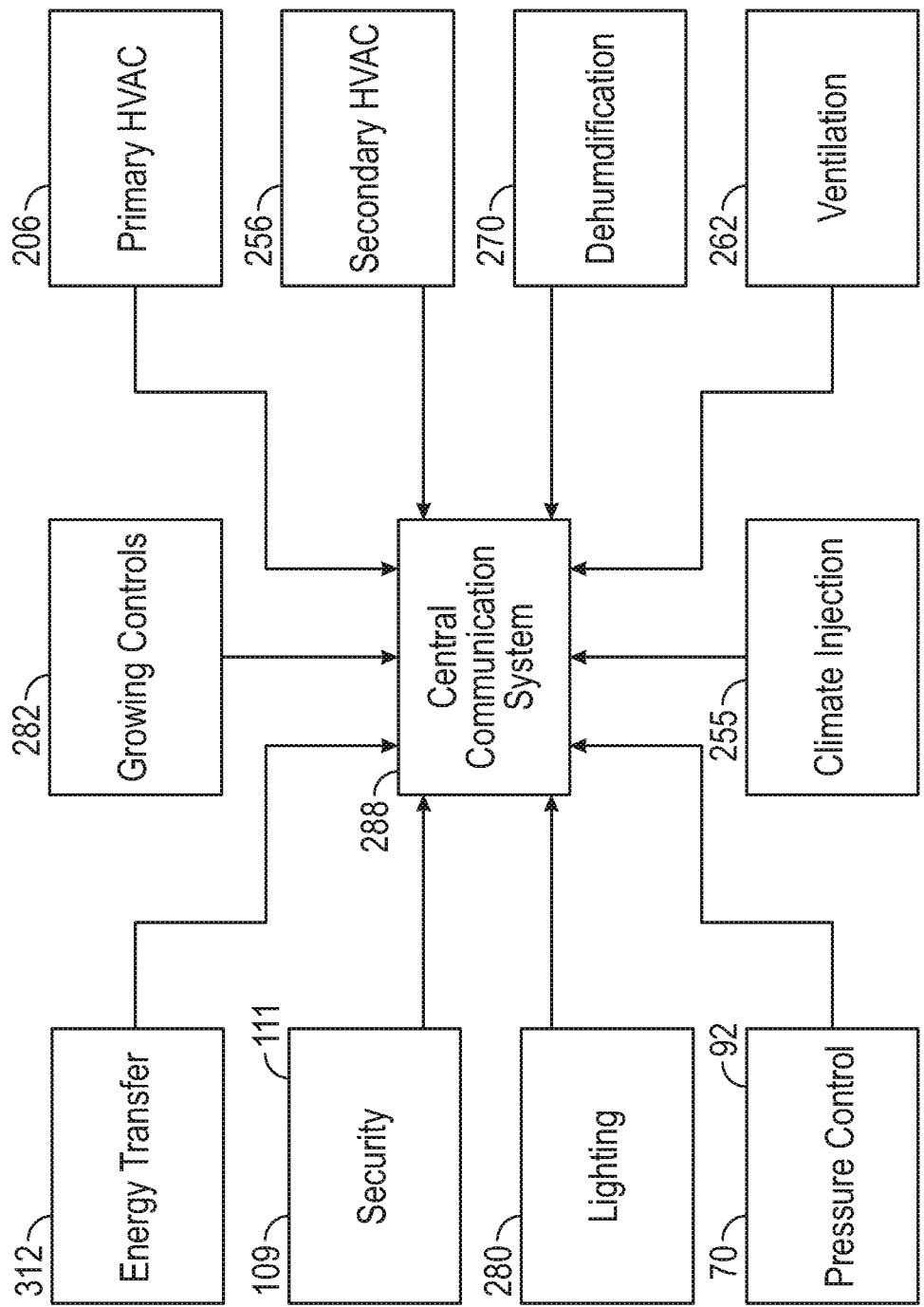
FIG. 6 is a schematic diagram of an exemplary control system for a controlled atmosphere system in accordance with the present disclosure.
Figure 8:
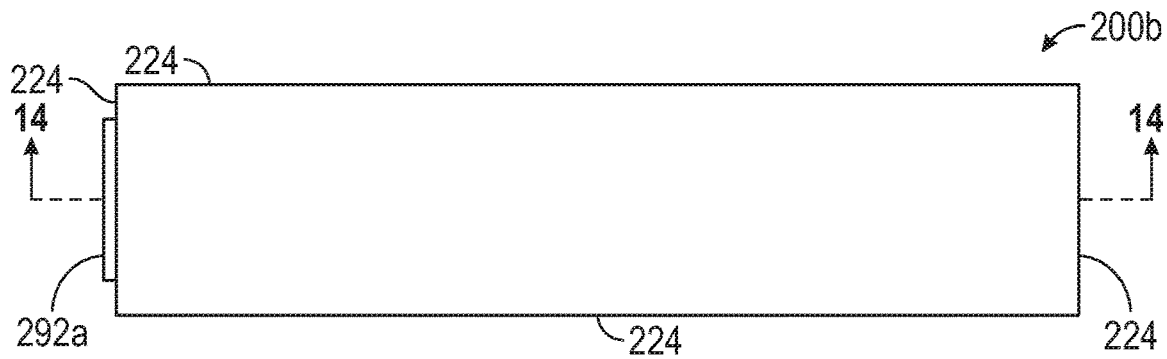
FIG. 8 is a schematic plan view of an exemplary embodiment of a moveable modular controlled atmosphere cell system in accordance with the present disclosure.
Figure 9:
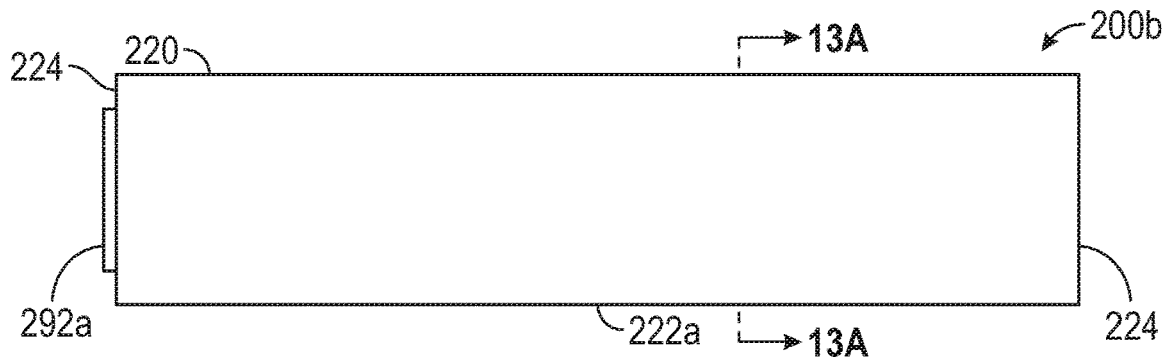
FIG. 9 is a schematic first elevational view of a first side of the moveable modular controlled atmosphere cell system of FIG. 8.
Figure 10:
FIG. 10 is a schematic second elevational view of a second side the moveable modular controlled atmosphere cell system of FIG. 8.
Figure 11:
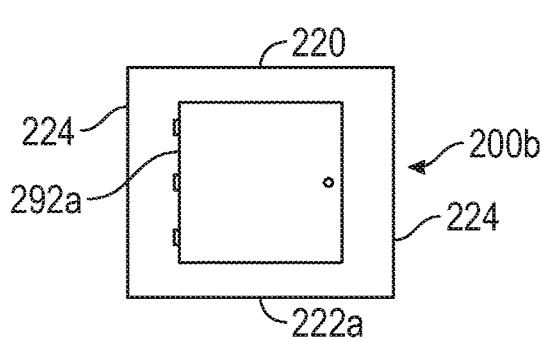
FIG. 11 is a schematic first end view of the moveable modular controlled atmosphere cell system of FIG. 8.
Figure 12:
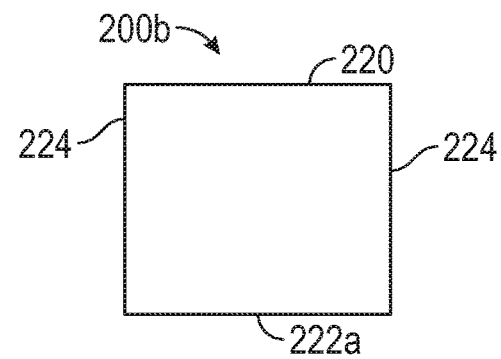
FIG. 12 is a schematic second end view of the moveable modular controlled atmosphere cell system of FIG. 8.
Figure 13A:
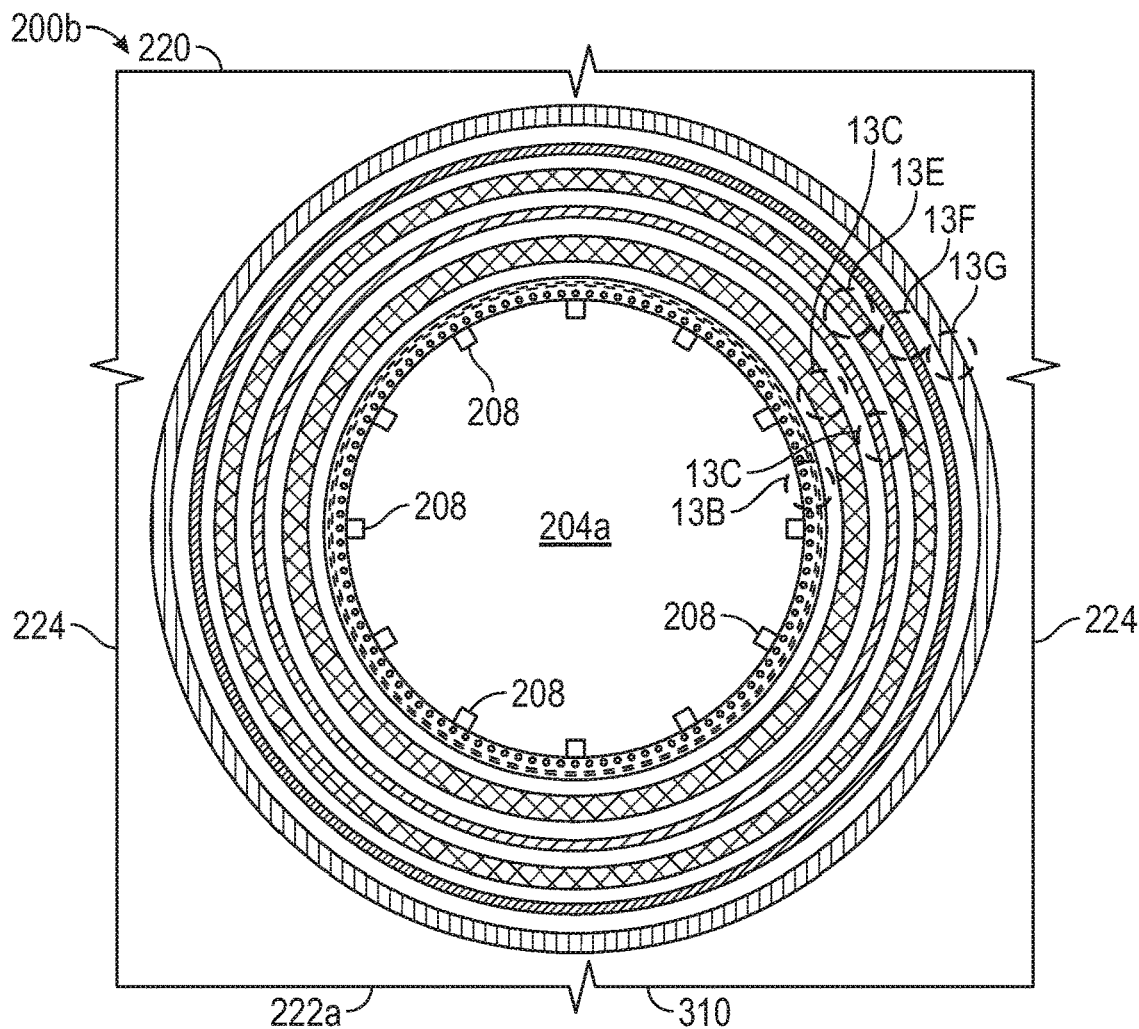
FIG. 13A is a schematic partial cross-sectional diagram of the moveable modular controlled atmosphere cell system of FIG. 9.
Figure 13B:
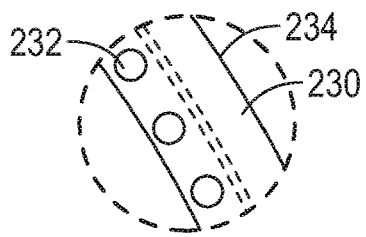
FIG. 13B is a partial cross-sectional view of the diagram of FIG. 13A.
Figure 13C:
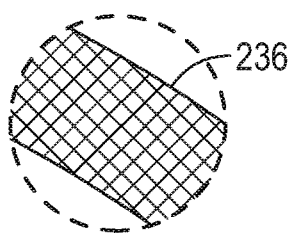
FIG. 13C is a partial cross-sectional view of the diagram of FIG. 13A.
Figure 13D:
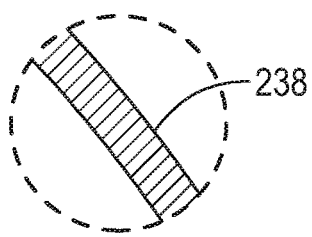
FIG. 13D is a partial cross-sectional view of the diagram of FIG. 13A.
Figure 13E:
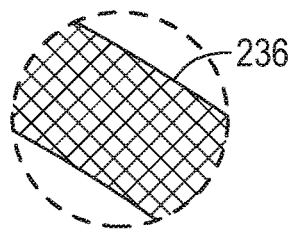
FIG. 13E is a partial cross-sectional view of the diagram of FIG. 13A.
Figure 13F:
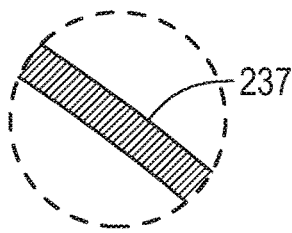
FIG. 13F is a partial cross-sectional view of the diagram of FIG. 13A.
Figure 13G:
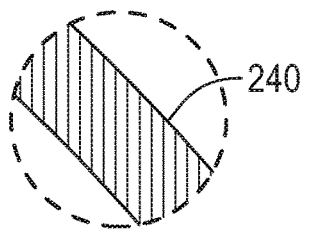
FIG. 13G is a partial cross-sectional view of the diagram of FIG. 13A.

As shown in FIG. 6, in one embodiment, the one or more computer processor 210 may be configured to control operation of the one or more other components of the controlled atmosphere system 200 through a central communication system 288. In one embodiment, the central communication system 288 may be connected to the internet. In one embodiment, the one or more computer processor 210 may control operation of the one or more other components of the controlled atmosphere system 200 remotely, that is, from a different location than the cell 202. In one embodiment, the one or more computer processor 210 may control operation of the one or more other components of the controlled atmosphere system 200 from within the cell 202. In one embodiment, the one or more computer processor 210 may control operation of the one or more other components of the controlled atmosphere system 200 from a combination of within the cell 202 and remotely.

The one or more computer processor 210 may receive and send information and/or controls through the central communication system 288 to one or more other components of the controlled atmosphere system 200 in order to control energy transfer (such as by modifying the controlled atmosphere system 200 to control thermal energy transfer rates 312), the growing controls 282, the heating/cooling unit 206, the enclosed-area heating/cooling unit 256, dehumidification (such as through the humidity control unit 270), ventilation (such as by controlling one or more of the exhaust vents 262 and/or other components), climate injection input 255 (such as input regarding environmental conditions, including past, current, and/or forecasted conditions, outside of the cell 202), internal pressure (such as information from the pressure sensor 70, and control of the pressure/vacuum unit 92), lighting (such as through lighting units 280), and security (such as via control of the first and/or second door(s) 109, 111, and/or other components).

Returning now to FIG. 4, the controlled atmosphere system 200 may have one or more sealable opening 290 leading to the external environment. The sealable opening 290 may be configured to prevent the transfer of air, gas, and/or moisture into the enclosed area 204 when the sealable opening 290 is sealed. In one embodiment, the sealable opening 290 is an opening configured to fit a first sealable door 292 and is connected to a passageway 294 leading to a second sealable door 296, which leads to the external environment. The passageway 294 may act as a further barrier to thermal transfer between the enclosed area 204 and the external environment. In one embodiment, one or more of the other components of the controlled atmosphere system 200 such as the one or more of the heating/cooling unit 206, the enclosed-area heating/cooling unit 256, the air compressor 260, the exhaust vents 262, the one or more pumps 264, and/or the humidity control unit 270, may be positioned in (or through) the passageway 294. In one embodiment, the controlled atmosphere system 200 may be completely self-contained and protected such that the controlled atmosphere system 200 may be usable in the event of a disaster.

In one embodiment, the first sealable door 292 and/or the second sealable door 296 may be secured and/or require security authorization to open and/or close.

In one embodiment, one or more of the other components of the controlled atmosphere system 200 such as the one or more of the heating/cooling unit 206, the enclosed-area heating/cooling unit 256, the air compressor 260, the exhaust vents 262, the one or more pumps 264, and/or the humidity control unit 270, may be positioned outside of the passageway 294, such as outside of the second sealable door 296. In one embodiment, one or more of the other components of the controlled atmosphere system 200 such as the enclosed-area heating/cooling unit 256, the air compressor 260, the exhaust vents 262, the one or more pumps 264, and/or the humidity control unit 270, may be connected to the delivery tubes 252 of the fifth layer 240 through the first sealable door 292 and/or the second sealable door 296 and/or through the outer layers of the top 220, the bottom 222, and/or the walls 224. In one embodiment, the one or more of the heating/cooling unit 206 may be connected to the energy-transfer tubing 232 through the first sealable door 292 and/or the second sealable door 296 and/or through the outer layers of the top 220, the bottom 222, and/or the walls 224.

In one embodiment, power may be received by one or more of the components of the controlled atmosphere system 200 (including, but not limited to, the one or more of the heating/cooling unit 206, the enclosed-area heating/cooling unit 256, the air compressor 260, the exhaust vents 262, the one or more pumps 264, the humidity control unit 270, central communication system 288, the growing controls 282, the one or more sensors 208, the layer sensors 254, the pressure/vacuum unit 92, lighting units 280, and the first and/or second door(s) 292, 296). The power may be supplied by one or more, or a combination of, power sources. For example, power may be supplied from, or through, one or more battery, a public electricity grid, one or more wind turbine, one or more solar panel, one or more geo-thermal source, generators using one or more of a variety of fuels (including compressed natural gas, propane, diesel, and/or gasoline), and so on. In one embodiment, power may be banked in one or more battery when available, or when inexpensive, and then used at a later time. For example, power may be generated through solar panels during the day and banked in one or more batteries and then used during the night. In another example, power may be pulled from a public electricity grid during "off-peak" times of lower public usage, banked in one or more batteries, and then used during "on-peak" times of high public usage.

In use, the controlled atmosphere system 200 may control the atmosphere within the enclosed area 204 of the cell 202 to maintain the conditions of the atmosphere within a predetermined range, such as by using predicted external conditions to determine incremental, precise changes to be made to hold the atmosphere of the enclosed area 204 within a precise range. For example, temperature within the enclosed area may be held within plus or minus one tenth of one degree Fahrenheit, humidity may be held within plus or minus one tenth of one percent, and/or pressure may be held within plus or minus five psi (for example, for a 150 psi target). As one example, the computer processor 210 may receive information regarding the conditions of the environment (past, current, and/or future forecasted conditions) external to the cell 202. The computer processor 210 may receive information regarding the conditions of the internal atmosphere within the enclosed area 204, such as from the one or more sensors 208, the layer sensors 254, and/or any other sensors. The computer processor 210 may predict the effects of the external environment on the internal atmosphere of the enclosed area 204 and may begin making changes to conditions in the internal atmosphere (such as, for example, temperature, humidity, pressure, etc.) before conditions change beyond a predetermined range, so as to keep the conditions within the predetermined range.

For example, the current temperature external to the cell 202 may be seventy-two degrees Fahrenheit and a cold front may be predicted to affect the external temperature to lower the external temperature to twenty degrees Fahrenheit in twelve hours from the current time. In this example, the predetermined range for the temperature of the atmosphere within the enclosed area 204 of the cell 202 may be between approximately thirty-nine and approximately forty-one degrees Fahrenheit and the current (and desired target) temperature in the enclosed area 204 as reported by the one or more sensors 208 may be forty degrees Fahrenheit.

Based on these example conditions, the computer processor 210 may utilize one or more system model, artificial intelligence, machine learning, neural networks, or a combination of those techniques, to predict the effect of the future external temperature change over the next twelve hours on the cell 202 and the atmosphere of the enclosed area 204. In one embodiment, the computer processor 210 may utilize one or more algorithms, such as heat transfer algorithms using the heat transfer coefficients of the materials in the top 220 and one or more walls 224 of the cell 202.

The computer processor 210 may then use that prediction to change the temperature of the first layer 230 of the cell 202 through control of the heating/cooling unit 206 to control the temperature of the energy-transfer material 250 through the energy-transfer tubing 232 in the first layer 230. The change of temperature of the first layer 230 of the cell 202 is used to control and stabilize the temperature of the atmosphere of the enclosed area 204 of the cell 202. In one embodiment, the computer processor 210 may use that prediction to control other components of the controlled atmosphere system 200 (such as the enclosed-area heating/cooling unit 256, the air compressor 260, the exhaust vents 262, the one or more pumps 264, and/or the humidity control unit 270) to control and stabilize the temperature of the atmosphere of the enclosed area 204 of the cell 202.

The changes and controls may be determined and implemented in order to maintain the temperature (or other conditions) of the atmosphere of the enclosed area 204 of the cell 202 within the predetermined range, which in this example is between approximately thirty-nine and approximately forty-one degrees Fahrenheit. In one embodiment, the temperature (or other conditions) of the atmosphere of the enclosed area 204 of the cell 202 may be maintained with more accuracy, such as within +/−0.1 degree Fahrenheit of the desired target temperature.

In one embodiment, the computer processor 210 may further utilize the data from the one or more sensors 208, the one or more layer sensors 254, and/or data regarding the thermal energy transfer coefficients of the layers of the top 220, bottom 222, and/or walls 224, in the prediction of the effect of the future external condition change on the cell 202 and the atmosphere of the enclosed area 204.

Incremental changes may be used to maintain the temperature (or other conditions of the atmosphere of the enclosed area 204) at a quasi-equilibrium state. This incremental change produces consistent conditions within the atmosphere of the enclosed area 204 while minimizing energy output. Rather than responding to changed external conditions after the change, incremental change based on predicted changes increases efficiency of the controlled atmosphere system 200 and increases consistency of the conditions of the atmosphere in the enclosed area 204.

The term "incremental" as used in the term "incremental change" herein means a measured, discrete, increase or decrease. The incremental change may be at fixed increments of the same quantity, of varying increments of differing quantities, and/or of exponential increment quantities increases or decrease, for example. Typically, incremental changes are considered to be smaller, multiple changes made to move from a current state to a differing state, in comparison to one larger change between a current state and a differing state. Incremental changes may also be used in the context of making a series of smaller changes to maintain an original state, in comparison to making a large change to return to the original state after movement away from that original state.

In one embodiment, increments of temperature changes over time may create an exponential curve, when charted, as the temperature approaches a predetermined target for equilibrium. The chart of such temperature change over time may be referred to as a "cooling curve" herein. In one embodiment, the total response of the conditions of the internal atmosphere of the enclosed area 204 is based on a natural response plus a forced response. The controlled atmosphere system 200 may add a forced response, such as by using one or more of the heating/cooling unit 206, the enclosed-area heating/cooling unit 256, the air compressor 260, the exhaust vents 262, the one or more pumps 264, the humidity control unit 270, the growing controls 282, the pressure/vacuum unit 92, lighting units 280, and the first and/or second door(s) 292, 296, for example. The forced response may create a natural response in the conditions of the internal atmosphere of the enclosed area 204. The natural response may be a transient response which reduces over time (such as in a sinusoidal decay), until a new steady state is established. This reduction over time may be graphed as an exponential curve.

In one embodiment, the computer processor 210 may utilize the received input regarding the environmental conditions outside of the cell 202 and/or predictions of environmental conditions outside the cell 202 to control devices outside of the cell 202 (for example, pumps connected to the water management device) and/or to alert people outside of the cell 202 as to predicted environmental conditions/events. In one embodiment, the controlled atmosphere system 200 may further comprise one or more speakers (not shown) to communicate information to people inside and/or outside of the cell 202.

One example of a use of the controlled atmosphere system 200 may be for the storage of vaccines, which must be kept within a specific range of temperature to maintain their potency and effectiveness. Another example of a use of the controlled atmosphere system 200 may be for growing crops, such as hydroponic crops. In such a use, lighting, humidity, and temperature may be controlled within the enclosed area 204 of the cell 202 to produce growth of the crops based on predetermined ranges of those atmospheric conditions that provide for maximum production of the plants. Another example of a use of the enclosed area 204 of the cell 202 of the controlled atmosphere system 200 is as a shelter for people during a disaster. Another example of a use of the enclosed area 204 of the cell 202 of the controlled atmosphere system 200 is as a surgical suite. Another example of a use of the enclosed area 204 of the cell 202 of the controlled atmosphere system 200 is as a hyperbaric chamber. Another example of a use of the enclosed area 204 of the cell 202 of the controlled atmosphere system 200 is as a chamber without oxygen, which could be used for storage or for the elimination of vermin from goods.

Another example of a use of the enclosed area 204 of the cell 202 of the controlled atmosphere system 200 is to contain one or more computer devices such as computer processors, computer-banks, and/or computer server-banks, so as to protect and control those computer devices and manage the heat output of those devices. In one embodiment, the controlled atmosphere system 200 may further comprise additional enclosed-area heating/cooling units 256, such as compressed-air based vortex coolers, or other coolers, that may be utilized to cool the one or more computer devices.

As another example, the controlled atmosphere system 200 may be used for disaster preparedness and/or the cell 202 may be used for disaster shelter. In one embodiment, the computer processor 210 may be used to predictively control the atmosphere in the enclosed area 204 proactively or in response to a disaster or threat. For example, the computer processor 210 may control other components of the controlled atmosphere system 200 to recycle breathable air, control temperature and humidity levels, prevent contaminants (or poisons or biological agents) from entering the atmosphere of the enclosed area 204, and so on. The structure of the cell 202 may be configured to maintain structural integrity and withstand strong external forces such as earthquakes, bomb blasts, atomic waves, radiation, tornadoes, hurricanes, strong winds, flying debris, and/or other disasters.

In another example, the controlled atmosphere system 200 may be used to change or maintain the temperature of items within the enclosed area 204. For example, when produce is harvested the produce may have a temperature consistent with the temperature of the external environment (or with temperatures caused by external factors after harvest). Some produce (for example, potatoes) may change consistency if abruptly exposed to a final storage temperature, such that the produce cools (or heats) too rapidly. Additionally, the produce may exude moisture as it cools or heats. Further, the produce may exude moisture and/or heat as it ripens or decomposes.

Therefore, the controlled atmosphere system 200 may change the temperature of the enclosed area 204 (such as by using one or more of the heating/cooling unit 206, the enclosed-area heating/cooling unit 256, the air compressor 260, the exhaust vents 262, the one or more pumps 264, the humidity control unit 270, the growing controls 282, the pressure/vacuum unit 92, lighting units 280, and the first and/or second door(s) 292, 296) to be within plus or minus five degrees of the temperature of the produce at the time of entry into the enclosed area 204.

Once the produce is placed in the enclosed area 204, the controlled atmosphere system 200 may change the temperature of the enclosed area 204 incrementally (such as by using one or more of the heating/cooling unit 206, the enclosed-area heating/cooling unit 256, the air compressor 260, the exhaust vents 262, the one or more pumps 264, the growing controls 282, the pressure/vacuum unit 92, lighting units 280, and the first and/or second door(s) 292, 296) at a predetermined rate that is determined to maintain a desired consistency (and/or flavor and/or ripeness) of the produce.

Additionally, or alternatively, the controlled atmosphere system 200 may sense changes in the humidity of the enclosed area 204 caused by the produce releasing moisture (such as by using the one or more sensors 208), and may change the humidity level in the enclosed area 204 to maintain a predetermined desired humidity level (such as by using the enclosed-area heating/cooling unit 256, the air compressor 260, the exhaust vents 262, the one or more pumps 264, the humidity control unit 270, for example).

Additionally, or alternately, the one or more computer processors 210 of the controlled atmosphere system 200 may execute computer readable instructions to predict changes in the humidity, gasses, temperature, or other conditions of the enclosed area 204 based on a model or prediction of changes caused by stored goods introduced and/or stored at different and/or differing temperatures, and may proactively (and/or incrementally) change the conditions of the enclosed area 204 (such as the humidity level in the enclosed area 204) to maintain predetermined desired conditions, such as humidity level (such as by using the enclosed-area heating/cooling unit 256, the air compressor 260, the exhaust vents 262, the one or more pumps 264, the humidity control unit 270, for example). In one embodiment, the one or more computer processors 210 may utilize one or more of, or combinations of, machine learning techniques, artificial intelligence techniques, neural network techniques, system modeling techniques, and/or predictive algorithms.

In one embodiment, the one or more computer processors 210 may utilize, for example, one or more of Laplace transforms and/or Fourier transforms, such as to transform functions of real variables to functions of complex variables. For example, the Fourier transform of a function is a complex function of a real variable (frequency), and the Laplace transform of a function is a complex function of a complex variable.

The controlled atmosphere system 200 may precisely and accurately maintain the conditions in the enclosed area 204. For example, temperature within the enclosed area 204 may be held within plus or minus one tenth of one degree Fahrenheit, humidity may be held within plus or minus one tenth of one percent, and/or pressure may be held within plus or minus five psi (for example, for a 150 psi target).

Of course, it will be understood that there are other uses contemplated for the controlled atmosphere system 200.

Turning now to FIGS. 7A-7C, in one embodiment, a controlled atmosphere system 200a comprises two or more cells 202. In the controlled atmosphere system 200a, the heating/cooling unit 206 is connectable to the energy-transfer tubing embedded in the concrete of the first layers of the two or more cells 202. Further, the one or more computer processor 210 may be configured to receive input from the one or more sensors 208 for the two or more cells 202 indicative of the state of the atmosphere within the enclosed area 204 within each of the two or more cells 202, and/or to receive input from the one or more layer sensors 254 indicative of the temperature of the first layer 230 of each of the two or more cells, and/or to receive input regarding environmental conditions outside of the cell 202, and to control operation of the heating/cooling unit 206 (and/or other components of the controlled atmosphere system 200a) based on the received input from the one or more sensor 208 of the two or more cells 202 and/or the received input regarding the environmental conditions outside of the two or more cells 202.

In one embodiment, the two or more cells 202 may be positioned adjacent to one another. In one embodiment, one or more of the heating/cooling unit 206, the enclosed-area heating/cooling unit 256, the air compressor 260, the pump 264, the humidity control unit 270, and/or the exhaust vents 262, may be positioned between the two or more cells 202, such as in one or more area 298. In one embodiment, at least a portion of the seventh layer 244 and the eighth layer 246 of the top 220, the one or more wall 224, and/or the bottom 222 of a first of the two or more cells 202 may be shared with a second of the two or more cells 202, which may form a unitary layer over both of the two or more cells 202 (see, for example, FIG. 7A and FIG. 7B). In one embodiment, one or more of the walls 224 of a first of the two or more cells 202 may be shared with a second of the two or more cells 202.

FIGS. 8-14 depict an exemplary moveable modular controlled atmosphere system 200b in accordance with the present disclosure. The modular controlled atmosphere system 200b is substantially similar to the controlled atmosphere systems 200, 200a, except as described below.

The top 220, a bottom 222a, and the one or more walls 224 of the modular controlled atmosphere system 200b may be integrally formed to form a unitary structure.

As shown in FIGS. 13A-13G and 14, the top 220, the bottom 222a, and the one or more walls 224 may comprise the first layer 230 formed of flexible concrete and/or reinforced flexible concrete ("specialty concrete") and having the plurality of energy-transfer tubing 232 embedded in the concrete; the second layer 234 positioned on the outside of the first layer 230 and comprising the sealant material; the third layer 236 positioned on the outside of the second layer 234 and comprising the aerated substrate material; and the fourth layer 238 positioned on the outside of the third layer 236 and comprising the moisture and gas impermeable material. In one embodiment, the sealant material of the second layer 234 may form a gas impermeable barrier. In one embodiment, the top 220, the bottom 222a, and the one or more walls 224 may further comprise a reflective layer 237, such as between the fourth layer 238 and the fifth layer 240. In one embodiment, the fifth layer 240 of the top 220, the bottom 222a, and the one or more walls 224 may be formed of steel. In one embodiment, the third layer 236 may be substantially enclosed in a bio-degradable lining for ease of installation. In one embodiment, the top 220, the bottom 222a, and the one or more walls 224 may comprise two or more of the first layer 230, the second layer 234, the third layer 236 and/or the fourth layer 238.

In one embodiment, the top 220, the bottom 222a, and the one or more walls 224 may further comprise a ninth layer 310. The ninth layer 310 may be the outermost layer of the cell 202 and may be a barrier between the external environment and the rest of the cell 202. In one embodiment, the ninth layer 310 may be made of steel.

In one embodiment, the top 220, the bottom 222a, and the one or more walls 224 may further comprise additional layers that cooperate to provide a desired thermal energy transfer rate 312 between the external environment and the enclosed area 204 of the cell 202.

In one embodiment, the top 220, the bottom 222a, and the one or more walls 224 may be constructed separately and then combined to form a unitary structure. In one embodiment, the fifth layer 240 may be curved such that the enclosed area 204 of the cell 202 has a rounded interior.

In one embodiment, the bottom 222a may be an inverse shape from the top 220, such that the top 220, the bottom 222a, and the one or more walls 224, cooperate to form a spherical shaped enclosed area 204a. In one embodiment, one or more of the outer-most layer(s) may have a rectangular prism shape or cube shape.

In one embodiment, one or more of the layers of the top 220, the bottom 222a, and the one or more walls 224 may be a thin shell structure. In a thin shell structure, the top 220 may have a first cross-sectional thickness and the one or more walls 224 may have a second cross-sectional thickness that is larger than the first cross-sectional thickness of the top 220. Additionally, or alternately, the bottom 222a may have a third cross-sectional thickness and the one or more walls 224 may have a fourth cross-sectional thickness that is larger than the third cross-sectional thickness of the bottom 222a.

In one embodiment, one or more of the layers of the top 220, the bottom 222a, and the one or more walls 224 may in combination have a cross-sectional width of less than five feet, such that the entire width of the controlled atmosphere system 200b includes ten feet consisting of the layers plus the width of the enclosed area 204a.

In one embodiment, the heating/cooling unit 206, the enclosed-area heating/cooling unit 256, the one or more air compressor 260, the one or more pump 264, and/or the humidity control unit 270 may be mounted to the cell 202.

In one embodiment, the modular controlled atmosphere system 200b may be shaped to fit on a flatbed truck, on a train car, on a barge, on a ship, and/or on a transport airplane, for transportation to different locations for use.

Figure 14:
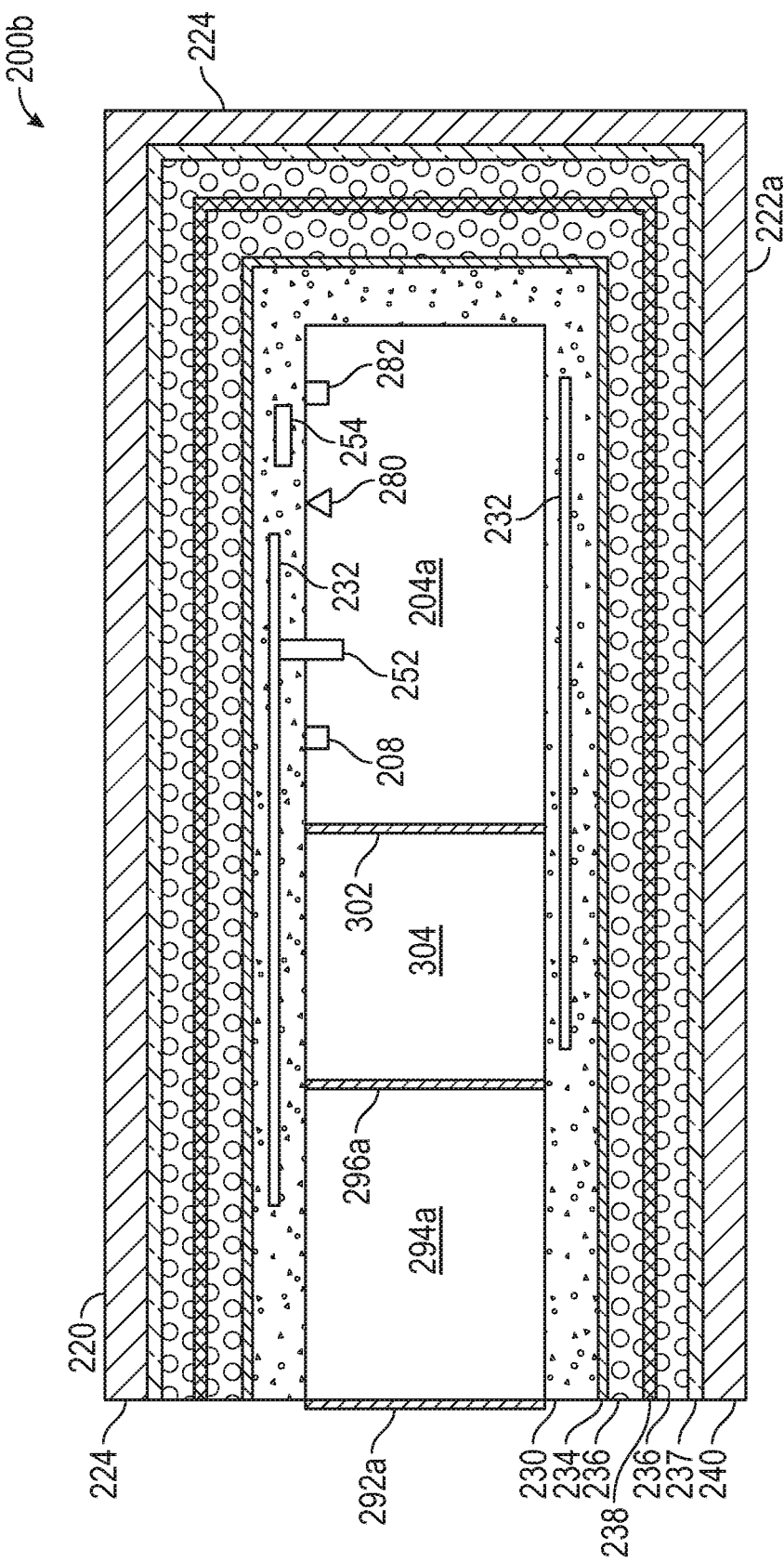
FIG. 14 is a schematic partial cross-sectional diagram of the moveable modular controlled atmosphere cell system of FIG. 8.

As illustrated in FIG. 14, the controlled atmosphere system 200b may have one or more sealable opening 290a leading to the external environment. The sealable opening 290a may be configured to prevent the transfer of air, gas, and/or moisture into the enclosed area 204a when the sealable opening 290a is sealed. In one embodiment, the sealable opening 290a is an opening configured to fit a first door 292a, a second door 296a, a passageway 294a between the first door 292a and the second door 296a, a third door 302, and an interlock area 304 between the second door 296a and the third door 302. In one embodiment, the modular controlled atmosphere system 200b may just have the first door 292a, the second door 296a, and the passageway 294a between the first door 292a and the second door 296a, where the passageway 294a may take the place of the interlock area 304.

The passageway 294a and/or the interlock area 304 may act as further barriers to thermal transfer between the enclosed area 204a and the external environment. In one embodiment, one or more of the other components of the controlled atmosphere system 200 such as the one or more of the heating/cooling unit 206, the enclosed-area heating/cooling unit 256, the air compressor 260, the exhaust vents 262, the one or more pumps 264, and/or the humidity control unit 270, may be positioned in (or through) the passageway 294. In one embodiment, the controlled atmosphere system 200b may be completely self-contained and protected such that the controlled atmosphere system 200b may be usable in the event of a disaster.

In one embodiment, the first door 292a, the second door 296a, and/or the third door 302, may be secured and/or require security authorization to open and/or close.

In one embodiment, the passageway 294a may have a height, a width, and a length, that are sized to contain a stock-moving machine, such as a forklift and/or a hand truck, when the first door 292a and the second door 296a are in a closed position. In one embodiment, the interlock area 304 may have a height, a width, and a length, that are sized to contain a stock-moving machine, such as a forklift and/or a hand truck, when the second door 296a and the third door 302 are in a closed position.

In use, a person may (or the one or more computer processors 210 may send signals to) open the first door 292a. The person and/or the stock-moving machine may enter the passageway 294a. The person may (or the one or more computer processors 210 may send signals to) close the first door 292a. In some embodiments, atmospheric conditions in the passageway 294a may then be changed to match conditions of the internal atmosphere of the enclosed area 204a. The person may (or the one or more computer processors 210 may send signals to) open the second door 296a. The person and/or the stock-moving machine may enter the interlock area 304 (in embodiments in which the interlock area 304 is used). The person may (or the one or more computer processors 210 may send signals to) close the second door 296a. In some embodiments, atmospheric conditions in the interlock area 304 may then be changed to match conditions of the internal atmosphere of the enclosed area 204a. The person may (or the one or more computer processors 210 may send signals to) open the third door 302 and enter the enclosed area 204a. Changing the atmospheric conditions in the passageway 294a and/or the interlock area 304 to match the enclosed area 204a reduces the impact of entry into the enclosed area 204a from the external atmosphere.

In use, the controlled atmosphere system 200b may be two or more controlled atmosphere systems 200b which may be moved to a desired geographical location. In one example, organic produce may be grown and stored in a series of the controlled atmosphere systems 200b, such as a series having a first, second, and third controlled atmosphere systems 200b. For example, the organic produce may start as seeds sprouted in the first controlled atmosphere system 200b, which may be controlled to predetermined conditions appropriate for sprouting particular types of seeds. Then the seedlings may be moved to the second controlled atmosphere systems 200b which may be controlled to predetermined conditions appropriate for growing particular plants and/or produce. Then the harvested plants and/or produce may be moved to the third controlled atmosphere system 200b, which may be controlled to remain within predetermined ranges of conditions (for example, temperature, humidity, pressure, gas mixture, etc.) appropriate for storage of the plants/produce.

In one embodiment, the information for certifying a process that takes place through a plurality of modular controlled atmosphere systems 200b (for example, organic certification of plants/produce) may be secured through the use of blockchain techniques. As is well known in the computer arts, blockchain typically refers to a growing list of records, called blocks, which are linked using cryptography. Each block contains a cryptographic hash of the previous block, a timestamp, and transaction data.

In use, one or more elements of the controlled atmosphere systems 200, 200a, 200b may be built on site. In one embodiment, specialty concrete (such as flexible concrete and/or reinforced flexible concrete) may be sourced from mobile mixers that mix and pour the specialty concrete on site. The mobile mixers may mix and pour concrete having predetermined characteristics that match a particular use of the controlled atmosphere systems 200, 200a, 200b.

While embodiments of the invention have been described for purposes of this disclosure, it will be understood that numerous changes may be made which will readily suggest themselves to those skilled in the art. Thus, changes may be made in the embodiments of the invention described herein, or in the parts or the elements of the embodiments described herein, or in the steps or sequence of steps of the methods described herein, without departing from the spirit and/or the scope of the invention as defined in the following claims.

Further, it will be understood that one or more elements of the controlled atmosphere systems 200, 200a, 200b and the facility 10 may be used in combination and/or exchange with one another.

CONCLUSION

Conventionally, facilities experience atmospheric condition swings and high energy and high cost responses to those condition changes. In accordance with the present disclosure, methods and systems are disclosed for quasi-equilibrium control of an atmosphere within an enclosed space. The problems are addressed through a layered-cell controlled atmosphere system and control of internal atmospheric conditions based on internal and external conditions and/or future conditions.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A controlled atmosphere system, comprising:
    a cell having a top, a bottom, and one or more walls extending between the top and the bottom defining an enclosed area inside the cell, wherein the top and the one or more walls comprise:
        a first layer formed of concrete and having a plurality of energy-transfer tubing, the first layer having an inside and an outside;
        a second layer having an inside and an outside, with the inside positioned on the outside of the first layer, the second layer comprising a sealant material;
        a third layer having an inside and an outside, with the inside positioned on the outside of the second layer, the third layer comprising an aerated substrate material; and
        a fourth layer having an inside and an outside, with the inside positioned on the outside of the third layer, the fourth layer comprising a moisture and gas impermeable material;
    a heating/cooling unit connectable to the energy-transfer tubing of the first layer of the cell to control temperature of the first layer and thereby control temperature of an atmosphere of the enclosed area inside the cell;
    one or more sensors within the enclosed area of the cell configured to monitor the atmosphere within the enclosed area; and
    one or more computer processors configured to:
        receive input from the one or more sensors indicative of a state of the atmosphere within the enclosed area within the cell;
        receive input regarding environmental conditions outside of the cell;
        predict effects of future changing environmental conditions outside the cell on the atmosphere of the enclosed area within the cell, wherein the effects would move the conditions of the atmosphere within the enclosed area within the cell outside of a predetermined range; and
        control operation of the heating/cooling unit based on the received input from the one or more sensors, the received input regarding environmental conditions outside of the cell, and the predicted effects of future changing environmental conditions outside the cell on the atmosphere of the enclosed area within the cell, such that the conditions of the atmosphere within the enclosed area within the cell are maintained within the predetermined range, by preventively implementing incremental changes to the atmosphere before the conditions of the atmosphere within the enclosed area within the cell change beyond the predetermined range.

2. The controlled atmosphere system of claim 1, wherein the top and the one or more walls further comprise one or more of:
    a fifth layer having an outside and an inside, the outside positioned on the inside of the first layer and comprising a laminate material; and
    a sixth layer having an outside and an inside, the outside positioned on the inside of the fifth layer and comprising a tubular sub-structure.

3. The controlled atmosphere system of claim 1, wherein the top and the one or more walls further comprise a seventh layer positioned on the outside of the fourth layer and comprising earth.

4. The controlled atmosphere system of claim 3, wherein the seventh layer has an inside positioned on the outside of the fourth layer and has an outside, and wherein the top and the one or more walls further comprise an eighth layer positioned on the outside of the seventh layer and comprising vegetation.

5. The controlled atmosphere system of claim 1, wherein the heating/cooling unit is a first heating/cooling unit, and further comprising an enclosed area second heating/cooling unit, connected to the enclosed area of the cell, comprising one or more of a reverse cycle chiller and a compressed-air based vortex cooler; and wherein the one or more computer processors are configured to control operation of the enclosed area second heating/cooling unit based on the received input from the one or more sensors, the received input regarding environmental conditions outside of the cell, and the predicted effects of future changing environmental conditions outside the cell on the atmosphere of the enclosed area within the cell, such that the conditions of the atmosphere within the enclosed area within the cell are maintained within the predetermined range, by preventively implementing incremental changes to the atmosphere before the conditions of the atmosphere within the enclosed area within the cell change beyond the predetermined range.

6. The controlled atmosphere system of claim 1, wherein the first layer of the cell is formed of reinforced flexible concrete.

7. The controlled atmosphere system of claim 1, wherein the one or more sensors are configured to transmit sensor data wirelessly as the input to the one or more computer processors.

8. The controlled atmosphere system of claim 1, wherein the one or more sensors comprise one or more of a temperature sensor, a humidity sensor, an infrared sensor, and a pressure sensor.

9. The controlled atmosphere system of claim 1, further comprising one or more temperature layer sensor positioned within the first layer and configured to sense temperature of the first layer.

10. The controlled atmosphere system of claim 1, wherein one or more of the top, the one or more walls, and the bottom are domed.

11. The controlled atmosphere system of claim 1, wherein certification of processes taking place within the controlled atmosphere system, including certification of plants as organic throughout a growth process, utilizes blockchain systems.

12. The controlled atmosphere system of claim 1, wherein predicting the effects of future environmental conditions outside the cell on the atmosphere of the enclosed area within the cell is based on use of one or more of artificial intelligence, machine learning, and neural networks.

13. The controlled atmosphere system of claim 1, wherein the heating/cooling unit is a first heating/cooling unit, and further comprising, connected to the enclosed area of the cell, one or more of: an air compressor, an enclosed area second heating/cooling unit, a pump, an exhaust vent, and a humidity control unit.

14. The controlled atmosphere system of claim 1, wherein the one or more computer processors is located remotely from the cell.

15. The controlled atmosphere system of claim 1, wherein the cell is a moveable modular integrally formed unitary structure.

16. The controlled atmosphere system of claim 15, wherein the heating/cooling unit is mounted on the cell.

17. The controlled atmosphere system of claim 1, wherein the cell is a first cell and the controlled atmosphere system further comprises a second cell having a top, a bottom, and one or more walls extending between the top and the bottom defining an enclosed area inside the second cell, wherein the top and the one or more walls of the second cell comprise:
a first layer formed of concrete and having a plurality of tubing, the first layer having an inside and an outside;
a second layer having an inside and an outside, with the inside positioned on the outside of the first layer, the second layer comprising a sealant material;
a third layer having an inside and an outside, with the inside positioned on the outside of the second layer, the third layer comprising an aerated substrate material; and
a fourth layer having an inside and an outside, with the inside positioned on the outside of the third layer, the fourth layer comprising a moisture impermeable material;
one or more sensors within the second cell configured to monitor an atmosphere within the enclosed area within the second cell;
wherein the heating/cooling unit is connectable to the energy-transfer tubing of the first layer of the first cell and the second cell; and
wherein the one or more computer processors are configured to:
receive input from the one or more sensors of the second cell indicative of a state of the atmosphere within the enclosed area within the second cell;
predict effects of future changing environmental conditions outside the second cell on the atmosphere of the enclosed area within the second cell, wherein the effects would move the conditions of the atmosphere within the enclosed area within the second cell outside of a second predetermined range; and
control operation of the heating/cooling unit based on the received input from the one or more sensors of the second cell, the received input regarding environmental conditions outside of the first cell and the second cell, and the predicted effects of future environmental conditions outside and the second cell on the atmosphere of the enclosed area within the second cell, such that the conditions of the atmosphere within the enclosed area within the second cell are maintained within the second predetermined range, by preventively implementing incremental changes to the atmosphere before the conditions of the atmosphere within the enclosed area within the second cell change beyond the second predetermined range.

18. The controlled atmosphere system of claim 17, wherein the sealant material of the second layer forms a gas impermeable barrier.

19. The controlled atmosphere system of claim 1, wherein one or more components of the controlled atmosphere system is located one or more of: partially underground, completely underground, above ground, and on the surface of the ground.

20. The controlled atmosphere system of claim 1, wherein the controlled atmosphere system is a modular moveable system configured to be transported to a location for use on the surface of the ground.

21. A method for controlling an atmosphere in a system, comprising:
monitoring, with one or more sensors, conditions of the atmosphere in an enclosed area of a cell, the cell having a top, a bottom, and one or more walls extending between the top and the bottom defining the enclosed area inside the cell, wherein the top and the one or more walls comprise:
a first layer formed of concrete and having a plurality of energy-transfer tubing, the first layer having an inside and an outside;
a second layer having an inside and an outside, with the inside positioned on the outside of the first layer, the second layer comprising a sealant material;
a third layer having an inside and an outside, with the inside positioned on the outside of the second layer, the third layer comprising an aerated substrate material; and
a fourth layer having an inside and an outside, with the inside positioned on the outside of the third layer, the fourth layer comprising a moisture and gas impermeable material;
receiving, with one or more computer processors, input from the one or more sensors indicative of conditions of the atmosphere within the enclosed area within the cell;
receiving, with the one or more computer processors, input regarding environmental conditions outside of the cell;
predicting effects of future changing environmental conditions outside the cell on the atmosphere of the enclosed area within the cell, wherein the effects would move the conditions of the atmosphere within the enclosed area within the cell outside of a predetermined range; and controlling, with the one or more computer processors, operation of a heating/cooling unit connectable to the energy-transfer tubing of the first layer of the cell to control temperature of the first layer, based on the received input from the one or more sensors, the received input regarding changing environmental conditions outside of the cell, and on the predicted effects of future environmental conditions outside the cell on the atmosphere of the enclosed area within the cell, thereby modifying one or more of the conditions of the atmosphere of the enclosed area inside the cell, such that the conditions of the atmosphere within the enclosed area within the cell are maintained within the predetermined range, by preventively implementing incremental changes to the atmosphere before the conditions of the atmosphere within the enclosed area within the cell change beyond the predetermined range.

22. The method for controlling an atmosphere in the system of claim 21, wherein controlling, with the one or more computer processors, operation of the heating/cooling unit based on the received input from the one or more sensors and the received input regarding environmental conditions outside of the cell is further based on predicting, with the one or more computer processors, effects of future environmental conditions outside of the cell on the conditions of the atmosphere of the enclosed area in the cell using one or more of artificial intelligence, machine learning, and neural networks.

23. The method for controlling an atmosphere in the system of claim 21, further comprising:

controlling the atmosphere in the enclosed area within the cell, such that the conditions of the atmosphere within the enclosed area within the cell are maintained within the predetermined range, by one or more of: adding gas into the enclosed area and removing gas from the enclosed area.

24. The method for controlling an atmosphere in the system of claim 21, wherein the cell is three or more cells, wherein the predetermined range is a first predetermined range in a first cell of the three or more cells, a second predetermined range in a second cell of the three or more cells, and a third predetermined range in a third cell of the three or more cells, and further comprising the following steps:

sprouting organic produce seedlings from seeds in the first cell of the three or more cells, wherein the first predetermined range of the conditions within the enclosed area within the first cell is a range of conditions to sprout the seeds;

moving the organic produce seedlings to the second cell of the three or more cells;

growing organic produce from the organic produce seedlings in the second cell, wherein the second predetermined range of the conditions within the enclosed area within the second cell is a range of conditions to grow the organic produce;

harvesting the organic produce;

moving the harvested organic produce to the third cell of the three or more cells, wherein the third predetermined range of the conditions within the enclosed area within the third cell is a range of conditions to store the organic produce; and utilizing a blockchain system to certify the organic produce seedlings and organic produce as organic throughout the sprouting, growing, harvesting, and moving steps.

25. The method for controlling an atmosphere in the system of claim 24, wherein the three or more cells are four or more cells, the method further comprising:

moving the organic produce to a fourth cell of the four or more cells, the fourth cell being a moveable modular cell; and moving the fourth cell from a first location to a second location.

* * * * *

UNITED STATES PATENT AND TRADEMARK OFFICE
CERTIFICATE OF CORRECTION

PATENT NO. : 11,359,829 B2
APPLICATION NO. : 16/460688
DATED : June 14, 2022
INVENTOR(S) : Rupert R. Thomas, Sr.

It is certified that error appears in the above-identified patent and that said Letters Patent is hereby corrected as shown below:

In the Claims
Column 32, Line 15: After "outside" delete "and" .

Signed and Sealed this
Nineteenth Day of July, 2022

Katherine Kelly Vidal
*Director of the United States Patent and Trademark Office*